(12) United States Patent
Pasulka

(10) Patent No.: US 7,063,814 B2
(45) Date of Patent: Jun. 20, 2006

(54) ACCELERATED STEEL CUTTING METHODS AND MACHINES FOR IMPLEMENTING SUCH METHODS

(76) Inventor: Matthew P. Pasulka, 164 Oldfield Dr., Fairfield, CT (US) 06824

( * ) Notice: Subject to any disclaimer, the term of this patent is extended or adjusted under 35 U.S.C. 154(b) by 323 days.

(21) Appl. No.: 10/322,194

(22) Filed: Dec. 18, 2002

(65) Prior Publication Data

US 2003/0168786 A1    Sep. 11, 2003

Related U.S. Application Data

(62) Division of application No. 09/637,896, filed on Aug. 14, 2000, now abandoned.

(60) Provisional application No. 60/162,205, filed on Oct. 29, 1999.

(51) Int. Cl.
*B23K 7/00* (2006.01)
(52) U.S. Cl. .......................... 266/48; 428/577; 428/600
(58) Field of Classification Search .................. 266/48, 266/50; 148/196, 201, 205; 428/577, 600
See application file for complete search history.

(56) References Cited

U.S. PATENT DOCUMENTS

| | | | | |
|---|---|---|---|---|
| 2,289,786 A | * | 7/1942 | Jones | 148/201 |
| 2,301,923 A | * | 11/1942 | Babcock | 148/205 |
| 2,470,999 A | * | 5/1949 | Meincke | 148/199 |
| 5,944,915 A | * | 8/1999 | Bissonnette | 148/205 |

* cited by examiner

*Primary Examiner*—Scott Kastler
(74) *Attorney, Agent, or Firm*—Bachman & LaPointe, P.C.

(57) ABSTRACT

A method for cutting steel includes heating a portion of the steel until it is molten, positioning a cutting torch to have a high angle of incidence relative to the molten steel, and blasting high pressure oxygen at the molten metal. The blast of high pressure oxygen further heats the molten metal and blows the molten metal away from the steel to create a cutting trench. The cutting torch is then moved generally parallel to the cutting method includes a cutting torch that emits a high pressure combustible gas and a high pressure combustion enhancing gas. The torch directs the high pressure gases at the steel so that the gases hit the steel at an acute angle of attack. An automated device propels the torch in the general direction of the desired cut. The resultant cut metal product has at least one edge with a grain pattern that is not perpendicular to the direction of cut.

4 Claims, 22 Drawing Sheets

ACCELERATED STEEL CUTTING METHODS AND MACHINES FOR IMPLEMENTING SUCH METHODS

CROSS REFERENCE TO RELATED APPLICATIONS

This application is a divisional of application Ser. No. 09/637,896, filed Aug. 14, 2000 now abandoned. This application is an application filed under 35 U.S.C. § 111(a) claiming benefit pursuant to 35 U.S.C. § 119(e) of the filing date of the Provisional Application 60/162,205 filed Oct. 29, 1999, pursuant to 35 U.S.C. § 111(b).

BACKGROUND OF THE INVENTION

1. Field of the Invention

The present invention is generally directed to new methods and machines for cutting metals, such as steel. More specifically, the present invention is directed to a process and apparatus by which steel is quickly cut so as to increase production capacity for steel fabrication, ship building, ship repair and heavy equipment production.

2. Background of the Invention

The traditional method of metal cutting involves the use of cutting torches that use oxygen and acetylene gases. The cutting torch operator sets the oxygen gas pressure level to about 40 to 60 pounds per square inch and sets the acetylene gas pressure level to about 8 to 12 pounds per square inch. With the cutting torch tip generally perpendicular to the surface it is cutting, the operator uses the cutting torch to heat the metal in a local area until it becomes about molten, and then applies additional oxygen to heat up the metal even more, thereby reducing the viscosity of the molten metal. With the same oxygen blast, the molten metal is blown out the other side of the metal plate. With the torch in a generally perpendicular position, the operator slowly moves the cutting tip manually along the proposed cutting line. The process of cutting steel is therefore a very slow and tedious process. Metal workers in shipyards, factories, and assembly shops across the country spend countless hours cutting steel from steel plate in desired shapes and sizes.

Conventional flame cutting machines cut with low pressures at relatively slow speeds. A current "high speed" track torch will cut through one-quarter inch steel plate no faster than about 24 inches per minute. Usually, the track torch will only be utilized at speeds of no faster than 16 inches per minute. Typically, a cutting torch uses oxygen and acetylene at 40 to 60 pounds per square inch and 8 to 12 pounds per square inch pressure levels, respectively.

In more advanced cutting machines that employ plasma arc cutting techniques, the machines are capable of moving up to 70 inches per minute. Although these machines are much quicker than conventional cutting torch machines, they are complex and very expensive to own and operate.

Another disadvantage of the current cutting machines and methods is that the due to the generally perpendicular positioning of the cutting torch tip or plasma arc tip with respect to the cutting surface, the cutting torch tends to cut not only the work piece but also the member that holds the work piece in place. For example, a steel plate is typically positioned on and supported by a cutting table. When the steel plate is cut, the supporting cutting table is also cut because the cutting flame from the cutting torch extends through the work piece and into the cutting table. Similarly, when a steel plate is on the side of a ship or attached or welded to a frame or other steel members, the frame or other steel members are damaged by the cutting torches when cutting the steel plate.

Still another disadvantage of conventional cutting machines and methods is that portions of the work piece becomes insulated from the heat of the flame and flowing oxygen which causes the prior art cutting machines to lose the cut, slow down, or have imperfect cuts that have to be re-cut. The work piece becomes insulated from the heat due to certain conditions of the metal, i.e., the work piece may be covered or partly covered with paint, rust or mill scale. Another reason is the occasionally improper setting of the torch height or heat output, either by the operator or by the computer numerical control (CNC).

Throughout the United States and the world, heavy industry has a dire need for faster, cheaper methods and machines for cutting metals in shipyards, factories and steel fabrication lots. As such, a need currently exists for an improved method and machine for cutting metal.

In view of the foregoing problems with the conventional art, a need exists for an improved method and machine for cutting metal that is faster, less expensive, produces a smoother cut, eliminates the problems of rust, mill scale and paint, and is capable of generally preserving the structure which supports the work piece.

SUMMARY OF THE INVENTION

The present invention overcomes the foregoing disadvantages of conventional methods of cutting and provides an inexpensive and improved apparatus and method for cutting metal that vastly increases the rate at which flame cutting of metal can be accomplished.

Accordingly, it is an objective of the present invention to provide an improved method that allows an operator to cut metal at a faster rate.

Another objective of the invention to provide a safe method for cutting metal quickly by using two different gases and orienting the cutting torch in different cutting positions with respect to an opposing surface of a piece of metal.

A further objective of the present invention to provide an improved metal cutting apparatus that allows an operator to cut metal at a faster rate.

Still another objective of the present invention is to provide a method for cutting metal at a lower cost.

Another objective of the present invention is to reduce or alleviate the problems caused by paint, rust or mill scale on a piece of metal.

These and other objectives of the present invention are accomplished by providing a relatively simple, but unique method for cutting metal that includes providing a cutting torch having a tip capable of selectively discharging two streams of different gases from two different gas supplies, positioning the cutting torch in opposition to a piece of metal and heating a localized area of the metal until it becomes about molten, then positioning the cutting torch such that it is in an angled position with respect to the piece of metal and increasing the gas pressure of at least one of the two gases to enhance the combustion of the first gas and increase the heat directed to the piece of metal, thereby expelling molten metal from the localized area and beyond.

Moreover, the objectives of the present invention are achieved by providing an apparatus and method for cutting metal that is particularly well suited for work in and about ships. The process includes, as exemplified in a first embodiment, heating a metal locally to a molten state or nearly a molten state, removing the molten metal using a highly pressurized gas, directing the molten metal away from the operator, adjusting at least one of the position and strength of the heat source so that the molten metal flows generally away from the operator thus making a generally even cut and moving the cutting torch in a direction generally parallel to the desired cut line to extend the cut line.

The apparatus of the present invention includes at least one cutting torch that uses pressurized gases at high pressure to cut a metal object. When cutting, the cutting torch has a torch tip which is positionable at an angle of attack that is less than 90°. The preferred range for the angle of attack of the torch tip is about 0–45° with a preferred angle range being about 0–10° so that the tip directs a stream of gas almost parallel with the surface to be cut. A motive device propels the cutting machine along a desired cut path to complete the desired cut so that the cutting torch continuously preheats and then cuts the metal along the desired cut line.

In yet another exemplary embodiment of the invention at least two torches are mounted and operated in similar manners and in still another embodiment of the invention a cutting torch supplied with pressurized gases is connected to a multi-jointed arm wherein the cutting torch is rotatable. The cutting torch is connected to a plurality of hinged joints wherein the base hinge joint is on a pivotal base.

The cutting torch may be connected to at least one ball and socket joint. In still another embodiment of the invention a cutting torch may remain stationary while being supplied with high pressure gas and the work piece moves past the cutting torch so that there is relative movement between the cutting torch and the work piece.

In yet another embodiment of the invention, a plurality of cutting torches are connected to a rail so that the distance between cutting torches may be adjusted and the cutting torches are also connected to an elevator mechanism so that the height of the cutting torches may be adjusted. The rail is connected to at least one carriage system so that the torches and the work piece have relative movement between each other.

In yet another embodiment of the invention a computerized numerical control (CNC) system is connected to the cutting torches.

The product resulting from the apparatus and methods of the present invention is also novel over the prior art. Specifically, a piece of metal is shaped by heating a portion of the metal until it reaches a molten state. The portion of molten metal is then removed from the piece of metal with high pressure gas. The molten metal, when blown by the high pressure gas out of a cutting trench, begins to cool. As the molten metal cools, it freezes on the metal piece in arcuate or linear shapes. The cut metal is thus distinguishable from the conventional cut metal because at least one edge has a grain which is generally parallel, about parallel, or diagonal to the edges of the cut.

The present invention is particularly well suited for cutting template metal pieces and abstract shapes. The apparatus includes at least one cutting torch that uses pressurized gases at high pressure rates to heat and cut a metal object. At least one cutting torch tip may be operably connected to the cutting torch, wherein the tip is positionable at an acute angle relative to the metal. The apparatus may include a motive device which causes relative movement between the cutting torch tip and preheated metal. The motive device propels the cutting apparatus along a desired cut path to complete the desired cut. A high pressure combustible gas is emitted from the cutting torch tip generally in the direction of the preheated metal. A high pressure combustion enhancing gas which is emitted from the cutting torch tip and directed generally at the preheated metal removes the metal from a cutting trench in the metal away from the cutting torch tip.

Additional objects and advantages of the invention are set forth in the detailed description herein, or will be apparent to those of ordinary skill in the art. Also, it should be appreciated that modifications and variations to the specifically illustrated and discussed steps and apparatus parts may be practiced in various embodiments and uses of this invention without departing from the spirit and scope thereof, by virtue of present reference thereto. Such variations may include but are not limited to, substitution of equivalent steps or components for those shown or discussed and the reversal of various steps, or the like.

BRIEF DESCRIPTION OF THE DRAWINGS

The above objects and advantages of the present invention will become more apparent by describing in detail preferred embodiments thereof with reference to the attached drawings in which:

FIG. 1 is a perspective view of a plane cutting apparatus;

DETAILED DESCRIPTION OF THE PREFERRED EMBODIMENTS

Figure 1:
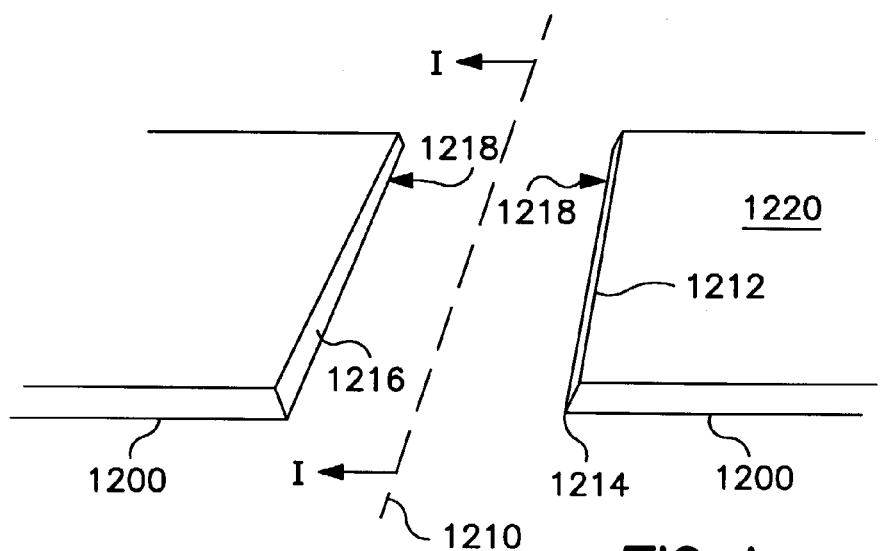
FIG. 1 is a perspective view of a piece of metal that has been cut using the present invention.

U.S. Pat. No. 5,922,144, which is directed to a method for cutting metal, is hereby incorporated by reference.

In order to cut metal at a constant rate, several factors must be controlled. In the present invention, the new position of the cutting torch, the higher pressures of the gases, and the different heat created by burning the combustible gas with high-pressure oxygen, are some of the factors which must be controlled. For instance, the angle of incidence ($\alpha_i$) of the cutting torch is changed by rotating the cutting torch flame from the cutting torch tip about a fixed point. The smaller the angle of incidence, the more heat that is transferred to a smaller, localized area of metal. Heat to an area of metal may also be regulated by moving the tip closer to the metal.

The following discussion is directed to a method for cutting steel according to the present invention.

Referring to FIGS. 13a–13d, a cutting torch 1000 is used to pre-heat an area 1006 of a workpiece 1010. The cutting torch 1000 may pre-heat the area 1006 in a number of ways. For instance, the torch 1000 may be positioned so that an angle of attack ($\alpha_a$) 1002 equals about 90° and an angle of incidence ($\alpha_i$) 1004 equals approximately 0°. However, a person having ordinary skill in the art may pre-heat the area in any number of different ways including where the angle of attack 1002 is greater than about 0° and the angle of incidence 1004 is about 90°. This method may be less efficient; however, it is-preferred because the cutting torch does not need to be repositioned before beginning to cut the metal after it has been pre-heated. Preferably, the area 1006 is heated by holding the cutting torch 1000 above the area 1006 until the area 1006 is about molten. When the area 1006 is about or semi-molten, the work piece 1010 which may be metal, preferably a mild steel, is ready to be cut.

A person having ordinary skill in the art is able to determine if the area 1006 has been preheated enough for cutting. When the pre-heated area 1006 is ready to be cut, the cutting torch 1000 is moved into a cutting position. A tip 1016 of the cutting torch 1000 should form an acute angle of attack with the work piece 1010. As will be described below, the angle of incidence 1004 and angle of attack 1002 need not be within the aforementioned range; however, in order to achieve maximum cutting efficiency, the cutting torch 1000 should be positioned according to those angular limits. The angle of attack is generally less than about 45°. Alternatively, the angle of incidence 1004 is about equal to or greater than 45°. In order to increase the cutting rate of the cutting torch 1000, the cutting torch tip 1016 is positioned at an angle of about 0–10° with the stream of gas flowing generally parallel to the surface being cut.

When the pre-heated area 1006 is about molten, application of additional combustion-enhancing gas causes oxidation of the work piece 1010 so that the metal turns completely molten. By oxidizing the metal, the pre-heated area 1006 will turn molten. The molten metal may be blown away from the cutting torch 1000 and the cutting torch tip 1016 (see FIG. 13b) as slag 1014. The pressures used to cut and remove the molten metal can range from conventional limits for both the combustion-enhancing gas and combustible gas (for example 50 psi oxygen and 12 psi acetylene) to at least pressures of 300 psi for the combustion-enhancing gas and at least 150 psi for the combustible gas. The combustion enhancing gas to combustible gases may be mixed in pressure ratios of about 2:1 to 4:1.

The combustion-enhancing gas is oxygen or gases with similar properties. The combustible gas can be any gas, but is preferably an LP gas or gases with similar properties. Other combustible gases are well known in the art. Preferred LP gases are propane, propylene, MAPP, natural gas and chemtane mixtures.

Figure 13A:
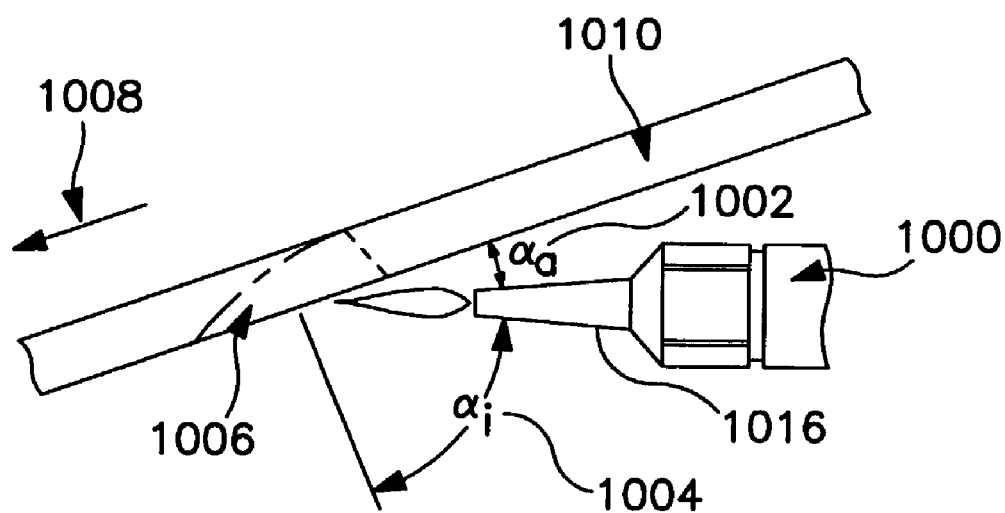
FIGS. 13a–13d illustrate the steps of a method to cut steel according to one embodiment of the invention.
Figure 13B:
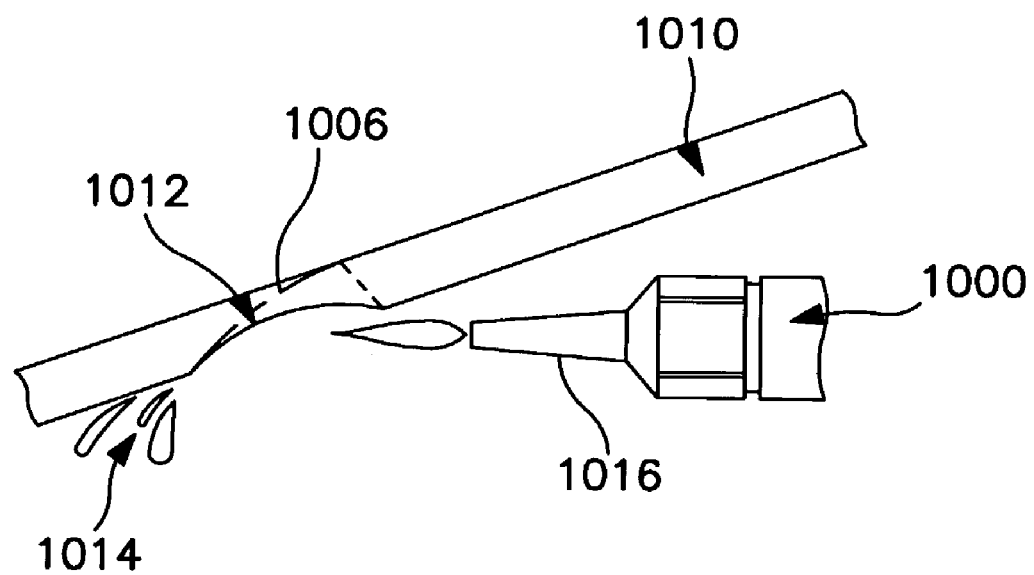
Figure 13C:
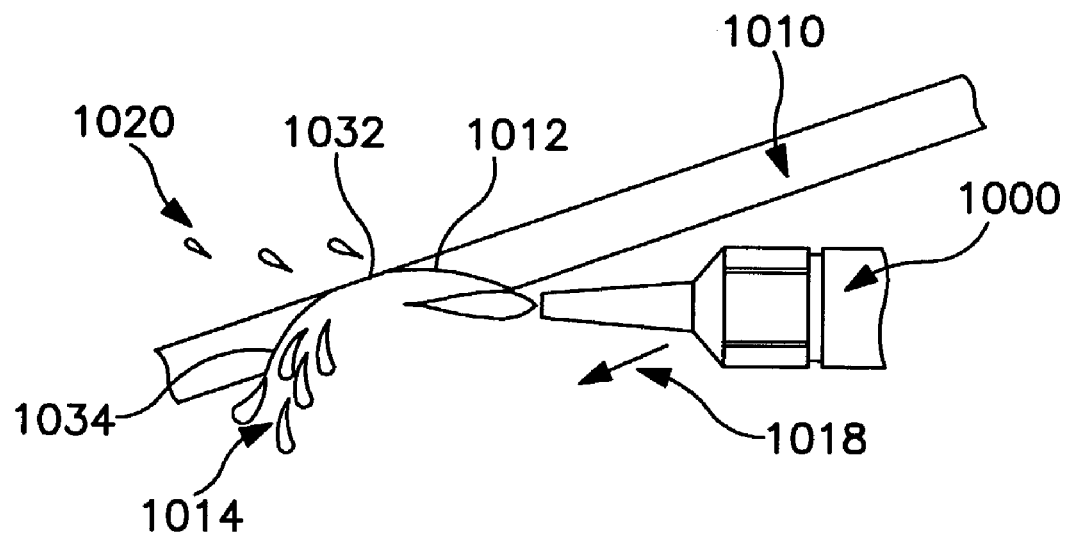

Referring now to FIG. 13c, the cutting torch 1000 moves in a direction 1018 to form a cutting trench 1012. At the point where the work piece 1010 is to be cut, the thickness of work piece 1010 becomes thinner and thinner. When the cutting trench 1012 is so deep that a remainder 1032 is thin enough and molten enough, the high pressure gases from the cutting torch 1000 creates slag 1020 on the side of the metal opposite the cutting torch 1000. As the cutting torch 1000 moves along the direction of movement 1018 so as to extend the cutting trench 1012, slag 1014 is removed from work piece 1010 from forward edge 1034 of the cutting trench 1012 or some slag 1014 may exit out of the cutting trench 1012 on the same side of cutting torch 1000, while the other slag 1020 exits on the side of the work piece 1010 opposite cutting torch 1000. Thus, slag may exit either on the same side, the opposite side or on both sides of the metal as the cutting torch 1000.

Figure 13D:
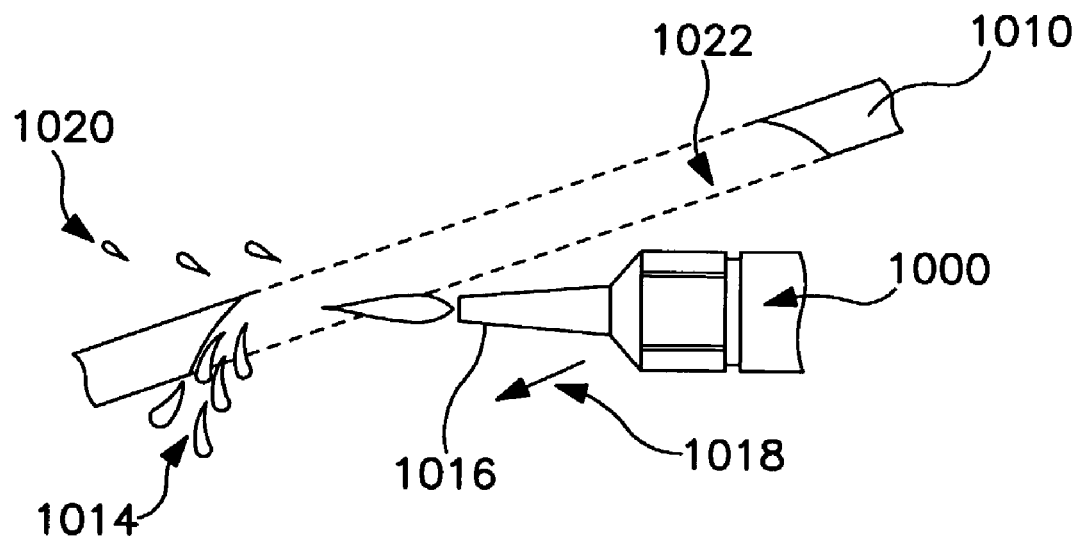

As shown in FIG. 13d, work piece 1010 has a section of cut metal 1022 removed from the burning process. Slag 1014 and 1020 are removed from the work piece 1010 as the cutting torch 1000 moves in the direction 1018 to extend the cut. Slag 1014 exits on the same side of the work piece as the cutting torch 1000 is positioned while slag 1020 exits from the work piece 1010 on the opposite side of the cutting torch 1000. The amount of slag which exits from each side is dependent upon the angle at which the cutting torch tip 1016 is presented to the work piece 1010 and the viscosity of the slag and the pressure of the gases forcing the slag away from the work piece 1010.

Figure 15:
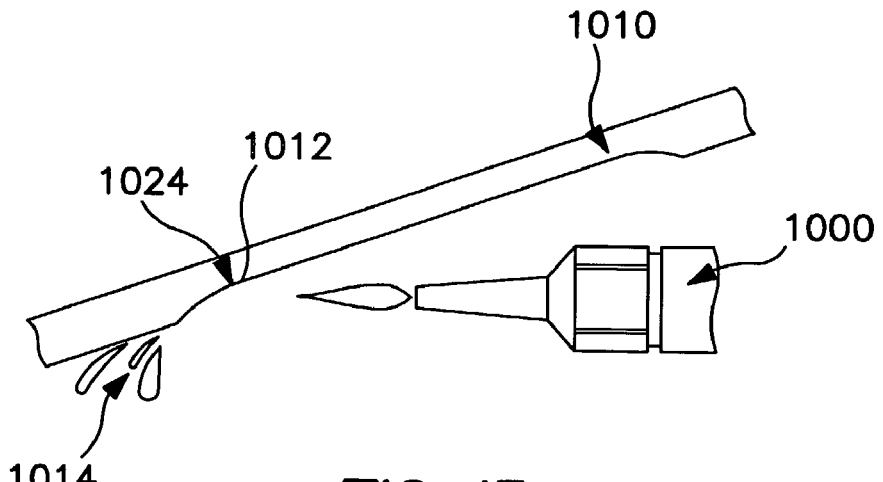
FIG. 15 is a cross-sectional view of a method of scarfing or gauging according to the present invention.

In another embodiment of the invention, as shown in FIG. 15, the cutting torch 1000 may cut a gouge or scarf 1024 in the work piece 1010 using generally the same techniques as described above to cut through a piece of metal. An operator having ordinary skill in the art will be able to position the torch and control the intensity and direction of the heat and combustible and combustion-enhancing gases so that the scarf or gouge 1024 may be formed in the work piece 1010. In forming the scarf or gouge 1024 in work piece 1010, the cutting trench 1012 extends only partially through the thickness of work piece 1010. Because the cutting trench only extends partially through work piece 1010, slag is generally not blown onto the side of the work piece opposite the cutting torch 1000. Scarfing or gouging is used in removing welds or smoothing out plates to take off burrs and the like from the surface of steel.

Another use of the scarfing technique is to remove one piece of steel from another piece of steel. This is better illustrated in the example of washing an exterior plate from internal framing members on a ship. This technique or process involves removing only one layer of steel while the second layer of steel may be left virtually untouched. Scarfing or gouging is well known in the art and may also be used to remove welds so that both the welded piece and welded base remain virtually intact and undamaged by the cutting method of this invention. During scarfing according to the present invention, a torch operator may manually move the torch at speeds of about 100 ft/hr while a machine-operated torch can move the torch at faster speeds. The slag generally travels on both sides of the cut plate after the cut communicates with both sides of the steel plate.

Figure 14A:
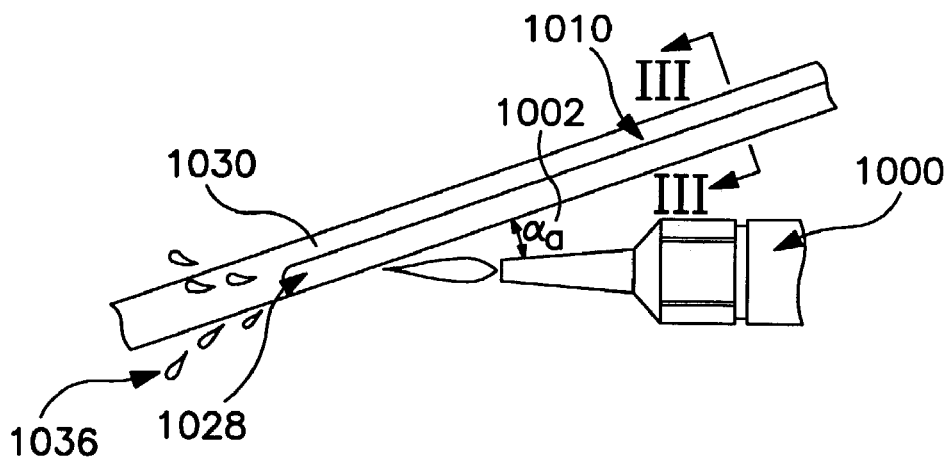
FIG. 14a shows a top view of the method according to the invention to shape a beveled edge.
Figure 14B:
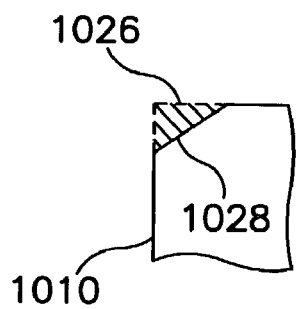
FIG. 14b shows an end view of the work piece using the method illustrated in FIG. 14a taken along section lines III—III.

FIGS. 14a and 14b illustrate a method of beveling steel according to the present invention. The new and improved process produces a flatter finished beveled edge 1028 in a short amount of time.

The work piece 1010 is beveled by an embodiment of the invention wherein the cutting torch 1000, which may or may not use a beveling tip, is presented to the work piece 1010 at an angle of attack 1002. The position of the cutting tip 1016 preferably has an angle of attack according to present invention, as described above. The cutting flame should be positioned at an uncut edge 1026 so that the angle of the desired bevel is attained according to known methods. The beveled edge 1029 is formed by pre-heating the uncut edge or the corner 1026 of the work piece 1010 and cutting using the above-described method to shape the uncut edge 1026 into a beveled edge 1028. Slag 1036 exits from the work piece 1010. As the cutting torch 1000 moves along an edge of the work piece 1010, the beveled edge 1028 is formed on work piece 1010 using generally the same techniques used to cut or scarf as mentioned above. The result is a generally smooth beveled edge that is cut quicker than with conventional methods. Additionally, this technique allows for a hand-held method to be utilized in addition to mechanized methods.

The metal cutting techniques described above can be started from an edge of the work piece or a middle portion of the work piece. Generally, the same techniques are used whether starting from the edge of a work piece or the middle of the work piece. From the edge of the work piece, the area of the work piece that is to be cut is pre-heated. A person having ordinary skill in the art is able to determine when the pre-heating is sufficient by viewing the color of the pre-heated area or with the use of sensors. At that time, the flow of the combustion-enhancing gas is increased so that the metal is oxidized and blown out of the preheated area from the cutting trench. This may be accomplished with the cutting torch in a variety of positions, from about perpendicular to about parallel with the cutting surface as discussed earlier. It is preferred that the cutting torch is positioned at an angle of attack less than 45°; however, the cutting torch may be positioned generally perpendicularly or with an angle of attack greater than 45°. Although these latter angles result in less efficiency, they may be necessary for cornering or moving into confined spaces or other similar situations.

Figure 12A:
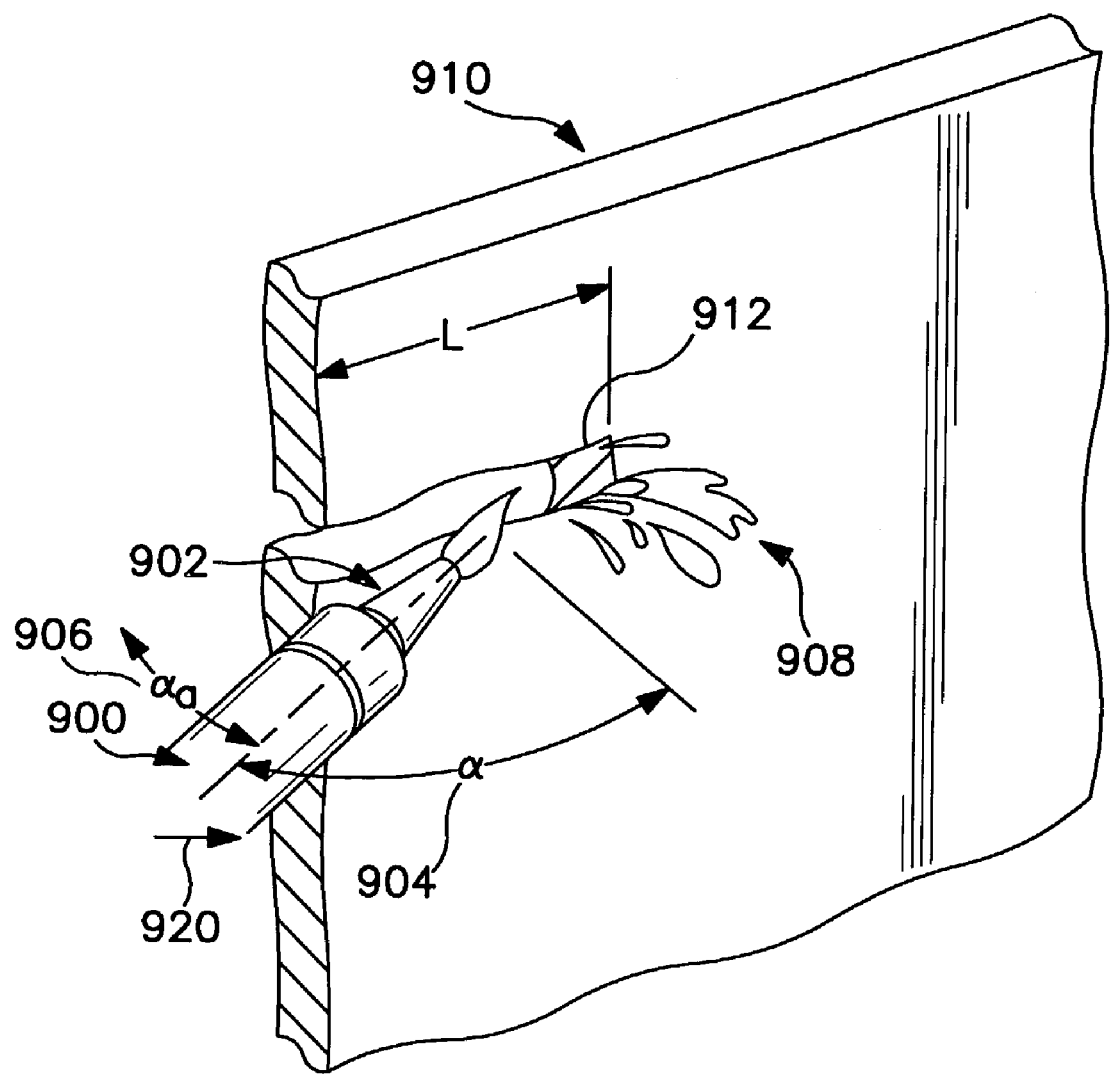
FIG. 12a is a perspective view of a cutting torch using the accelerated steel cutting method.

FIGS. 12a–12d further illustrate the method of the present invention for moving the cutting torch between angles of attack positions so that efficiency and precision may be maximized. Referring now to FIG. 12a, a cutting torch 900 moves in a horizontal or x-axis direction 920 so that an x-axis cut 916 is formed (see FIG. 12b). The cutting torch 900 has an angle of attack ($\alpha_a$) 906 and an angle of incidence ($\alpha_i$) 904. The angle of attack is less than about 45°, preferably less than 10°, to achieve maximum efficiency and may even be almost 0° or parallel to the metal surface so that the cutting torch 900 may efficiently pre-heat an area 912 and cut the horizontal cut 916 so as to remove slag 908 from the cutting trench in the most efficient manner. Cut length L shows the desired length of cut in a work piece 910.

Figure 12B:
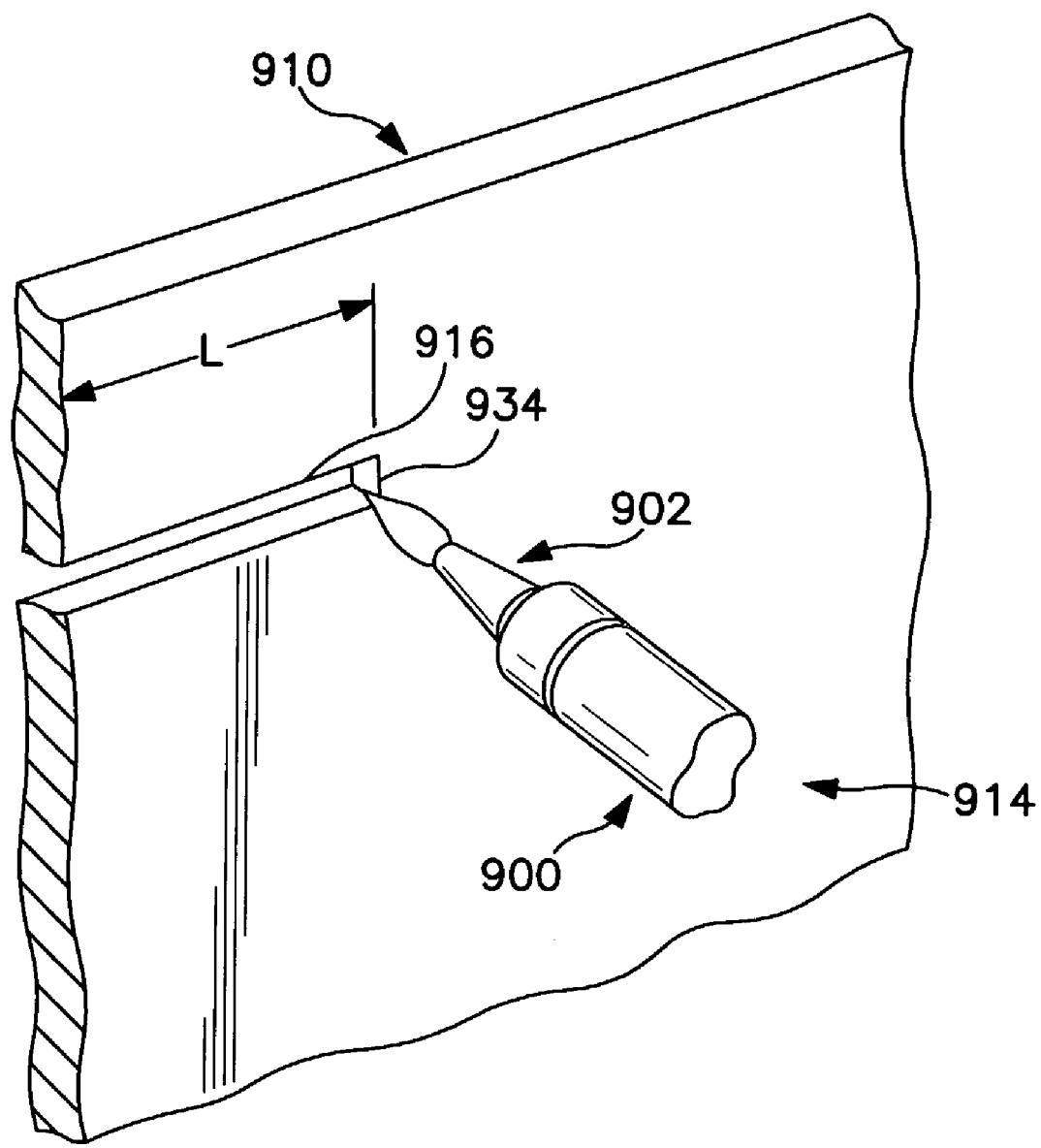
FIG. 12b is a perspective view of a cutting torch in a stop position.

As shown in FIG. 12b, the horizontal cut 916 extends to the limit of the cut length L for a precise cut. Preferably, the cutting torch 900 is moved from a preferred angle of attack to a generally perpendicular position so that the horizontal cut 916 may be more easily controlled to stop at the end of the desired cut length L. The point at which the torch should be moved from an angle of attack of preferably less than 45° to an angle of attack generally about 90° or generally perpendicular to the work piece 910 depends on many factors including experience of the burner, the size of a cutting tip 902, the pressures of the combustion-enhancing gas and combustible gas, the position of the torch 900 in relation to a forward edge 934 of the cut 916, the degree of squareness desired, and the precision of the equipment or operator, among others.

Figure 12C:
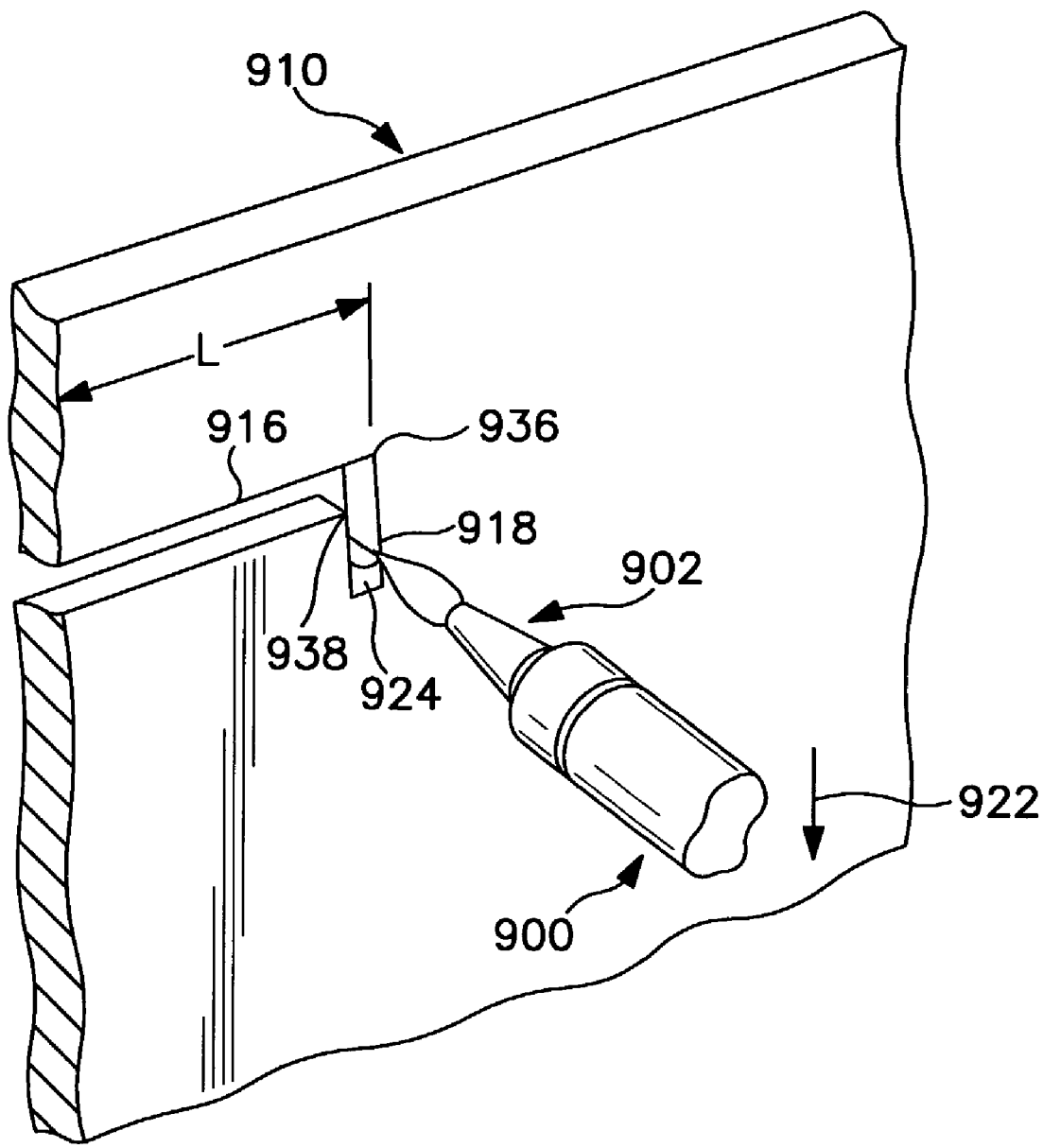
FIG. 12c shows a cutting torch moving from a stop position in FIG. 12b to a cutting position.

FIG. 12b shows an example where a high degree of precision is needed, and the cutting torch 900 is moved to a generally perpendicular position before changing directions in the cut. Referring to FIG. 12c, the horizontal cut or x-axis cut 916 extends the length L before changing directions into a vertical cut or y-axis cut 918. If the torch is generally stopped at the change of direction point of the cut, then a high degree of squareness will be achieved in the cornering. If, however, the horizontal torch is not fully stopped before moving in another direction, there will be a degree of roundness in a corner 936. In some work a degree of roundness is required. For example, in the ship building industry, a radius is required on many corners. In other applications, a right angle is required. As explained above, either may be achieved by the present invention.

Figure 6:
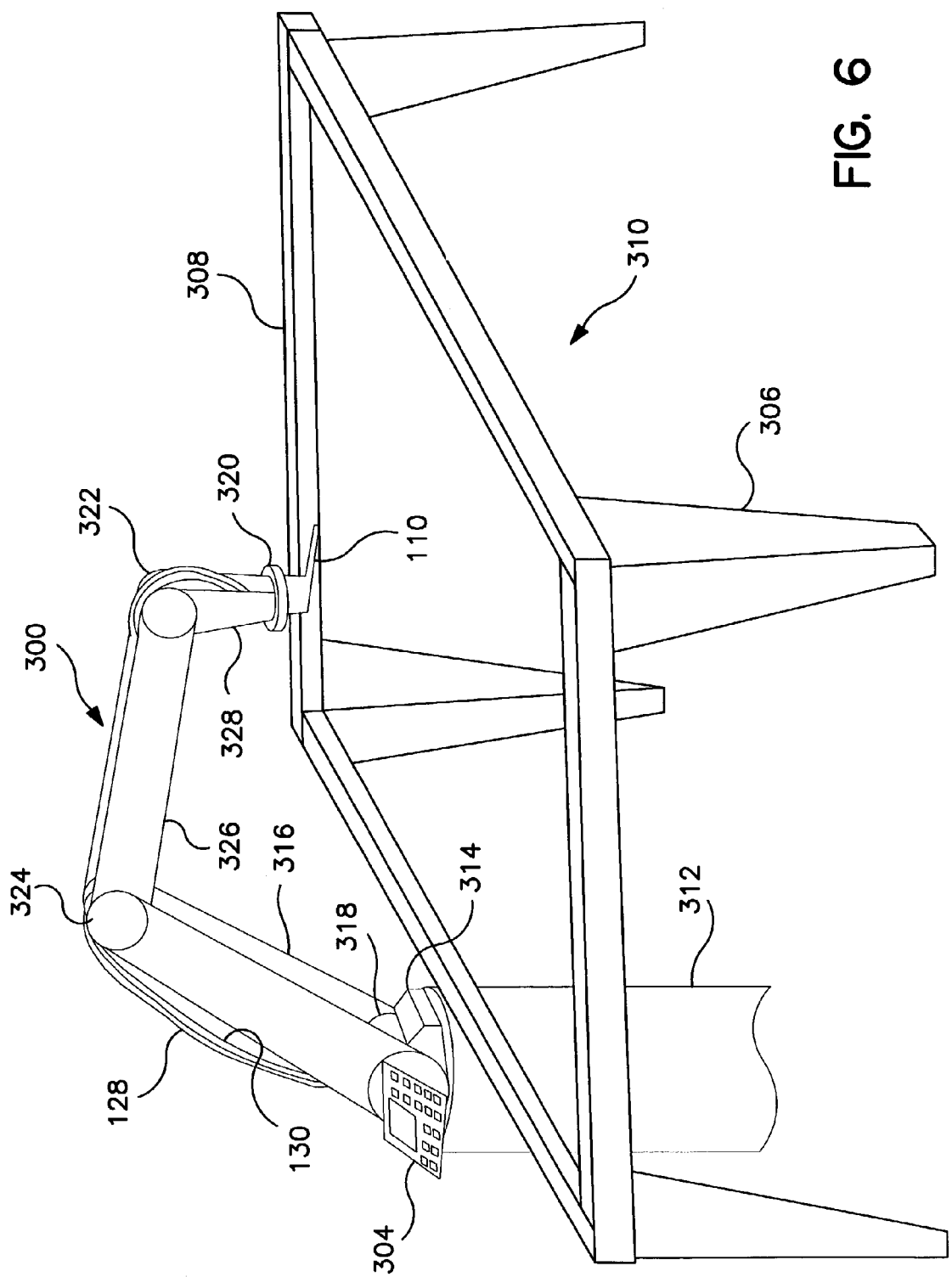
FIG. 6 is a perspective view of a robotic arm cutting torch.
Figure 7:
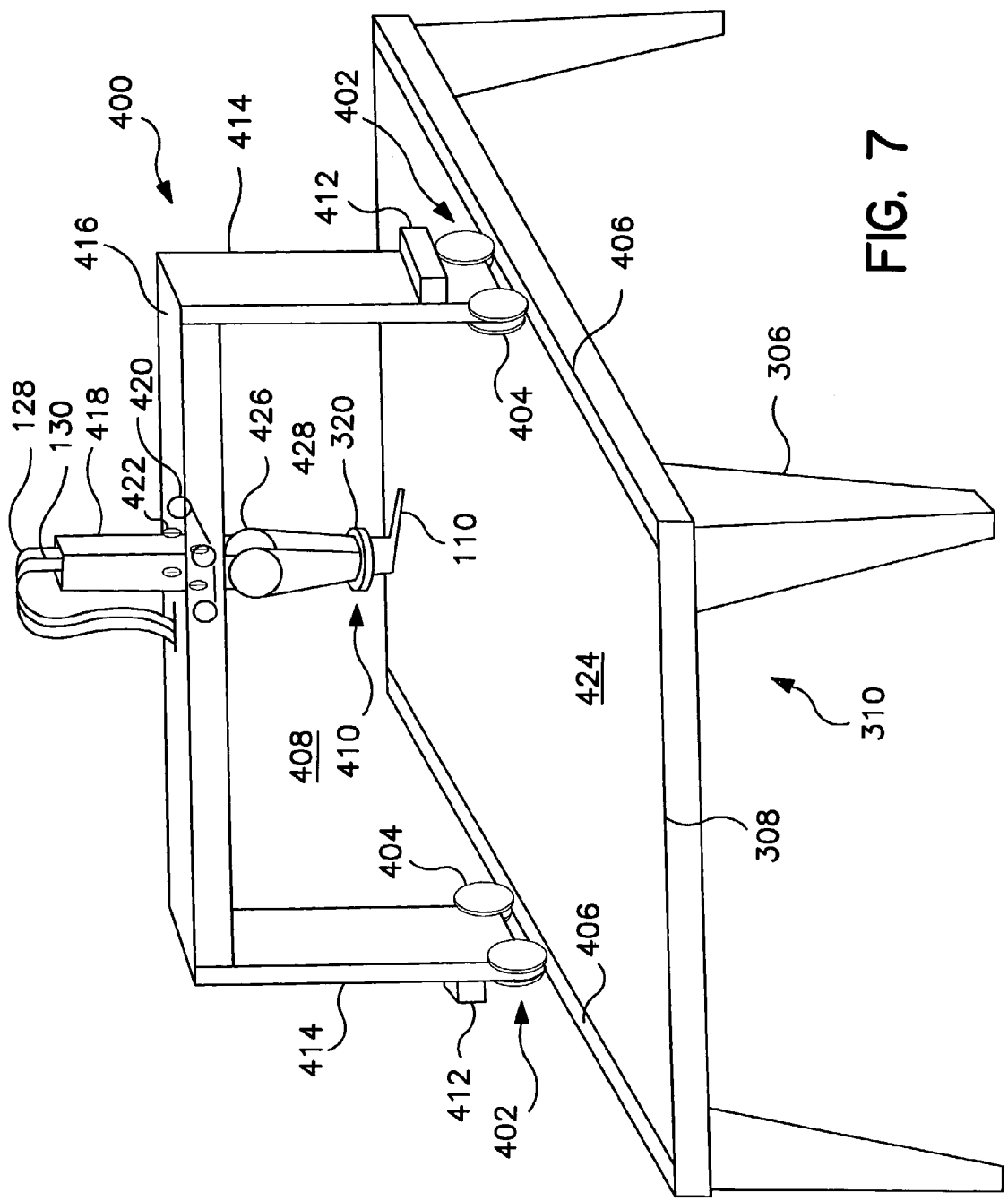
FIG. 7 is a perspective view of a single carriage cutting torch.

Another way to achieve roundness in corners 936 and 938 is to leave the cutting torch 900 at an angle of attack that is not generally perpendicular so that the torch 900 traces an arcuate shape. This may be done, for example, with an embodiment described below and as shown in FIGS. 6 and 7 or in a situation where the torch is mounted to a pivotable mount.

Referring now to FIG. 12c, the cutting torch 900 is moved in a vertical direction to change the direction of the horizontal cut 916. By moving in a vertical or y-axis direction 922, the cutting torch 900 directs the cutting tip 902 and the flame to a pre-heated area 924, thus creating a small vertical cut 918. The small cut is defined by the operator who determines when to move the tip to a different position. The quicker the torch is moved from the perpendicular position to an acute angle position, the faster the torch will cut the metal. An important factor in determining how far to rotate the tip and when to rotate the tip and what pressures should be applied is determined by the leading preheat area 924. When preheat area 924 is heated the torch is moved in the vertical direction and a corner is formed. To increase cutting speed, the cutting torch tip is preferably rotated as illustrated, for example by angle of attack 906 in FIG. 12d. The resulting corners 936 and 938 are square. As the vertical or y-axis cut 918 is established and the pre-heated area 924 is ahead of the direction of the cut, the cutting torch tip 902 may be moved into a preferred position so that an acute angle is formed between the tip 902 and the metal to allow for faster cutting.

Figure 12D:
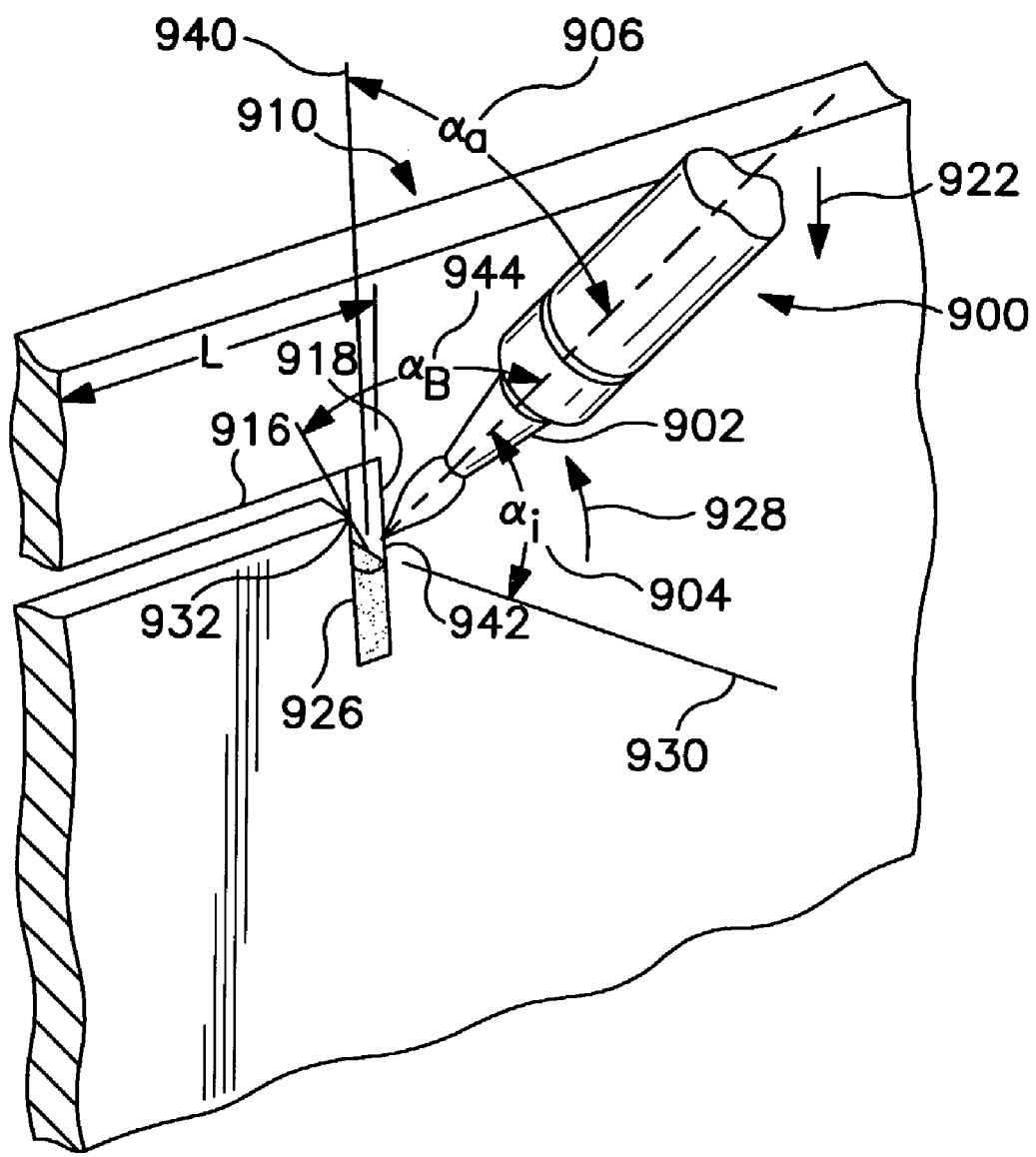
FIG. 12d is another perspective view of a cutting torch using the accelerated steel cutting method.

Referring now to FIG. 12d, the cutting torch 900 is moved from a generally perpendicular position to a position with an angle of attack 906 or an angle of incidence 904 wherein an acute angle is formed between the cutting torch tip 902 and the metal 910. The cutting torch 900 may be moved within a plane that contains an imaginary line or a cut line 940 and a perpendicular line 930 of the work piece 910. If the cutting torch 900 is rotated in the imaginary plane containing the imaginary perpendicular line 930 and cut line 940, a cut wall 942 will generally be parallel to the perpendicular line 930. If the cutting torch has an angle ($\alpha_\beta$) 944 out of the imaginary plane, then the cut wall 942 will not be generally parallel to the perpendicular line 930. In other words, by adding angle $\alpha_\beta$, the cut wall 942 may have a beveled edge.

When the cutting torch 900 is pivoted in the direction of the pivot arrow 928, the rate of cut of the cutting torch 900 in the direction of the vertical direction arrow 922 may be increased because a larger pre-heat area 926 will be formed. Depending on the thickness, the smaller the angle of attack 906, the faster the cutting torch 900 may be moved in the vertical direction 922 while still maintaining the cut. The limitations of the speed of the cutting torch 900 are dependent upon many factors including the size of the tip 902, the pressure of the cutting gases, the distance of the cutting torch from the work piece 910, the skill of the operator or complexity of the machine and the thickness of the metal. If the work piece 910 is not cut on the first pass, then multiple passes may need to be made with the cutting torch 900 or the cutting torch 900 must be slowed in order to achieve a complete cut through the work piece. By reducing the angle of attack 906, pre-heated area 926 will increase, thus allowing for increased speed. However, the pre-heated area should extend through the entire depth of the cut or else multiple passes may have to be made through the work piece unless a scarf or gouge is desired.

This method of cutting steel, whether by hand or by machine, is ideal for cutting metal that has paint or rust on it. In normal cutting operations, paint and rust on the surface of the metal impede the cutting process. With the cutting torch at an angle of attack less than 90°, the cutting torch is able to get below the paint and rust and cut fresh steel so that the paint and rust is effectively blown away with the slag without having to cut through the paint and rust. This allows for less restarts caused by popping paint and rust, which can extinguish the flame, or, if an operator is standing close by, cause concern for safety for the operator which ultimately slows the cutting process. Additionally, many metals are coated with different resins to impede the rusting process. One advantage of this invention is that it allows an operator using this method to stand away from the actual cutting area so that smoke and fumes from the coatings do not irritate the operator's eyes, nose, mouth, throat, or skin.

In adapting this method to automated machines, many factors need to be correlated so that the metal is cut smoothly and efficiently. While cutting by hand, an operator is slowed during the cutting process by having to reposition himself numerous times in a short period. In order to cut straight lines while operating a hand-held torch, an operator must attempt to keep steady and hold a straight line while shuffling past the metal while keeping the torch on the cut line. Often in repositioning himself, the operator loses the fluidity of the cut by taking the torch off the pre-heated area so that he must go back and re-establish his cut after positioning himself before cutting efficiently again. The operator also cannot cut a straight line using a handheld torch. With machines, this is no longer a problem because motors and engines may continuously drive the machines forward while holding the cutting torch in a precise position so that the pre-heated area is prevented from cooling and the cutting efficiency is maximized, while keeping the torch from diverting from the cut line.

Although the above-described methods for carrying out the present invention can be performed manually, an apparatus for maximizing the efficiency and precision of the method of the present invention will now be described.

Figure 4:
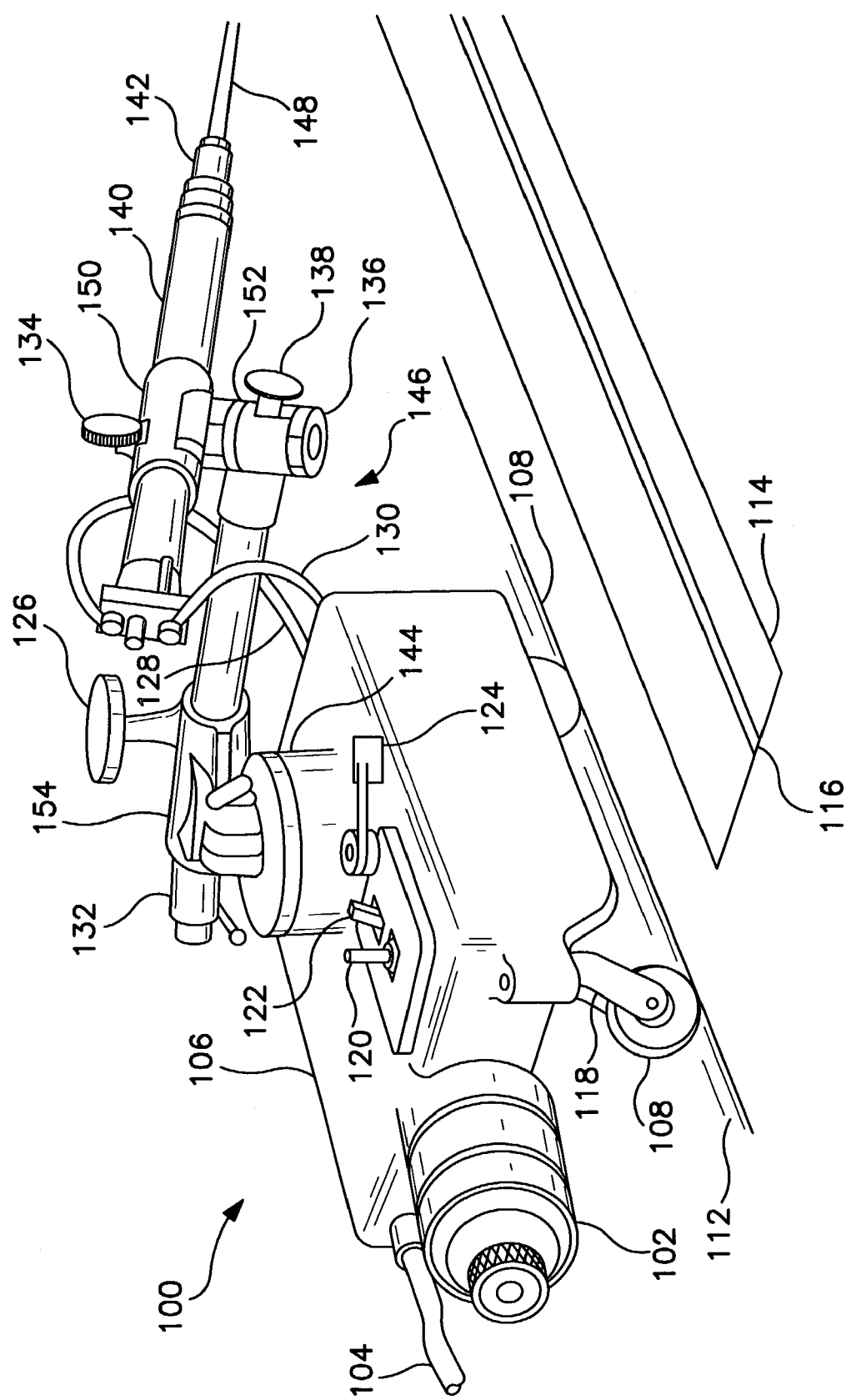
FIG. 4 is a perspective view of a track cutting torch in accordance with an embodiment of the invention.

Referring to FIG. 4, a track torch 100 has a torch 140 adjustably mounted to a device body 106. The torch 140 has a torch tip 142 which is selected according to the types and the pressures of gases used, the speed of the cut desired, the thickness of the metal, and the desired amount of kerf. Kerf generally refers to the metal loss due to the width of a cut 116. The torch 140 preferably has a tip number from 00000 to 12 in size. Other size tips will work as well. The larger the tip number the faster the rate for cutting in a single pass with appropriate pressures; however, the larger the tip, the larger the kerf. The torch 140 is supplied with a line of combustible gas 130 and a line of combustion-enhancing gas 128. The combustion-enhancing gas is delivered within conventional pressures that can be about 10 psi up to pressures of at least 300 psi. The combustible gas may be delivered at pressures as low as 3 or 4 psi up to about at least 150 psi. The gas pressures are related to each other, in that too much of a combustion-enhancing gas will cause the combustion of the combustible gas to cease, whereas too much combustible gas will causes a fuel rich mixture and improper results. The ratio of combustible gas to combustion enhancing gas pressures is from about 1:1.5 to 1:5 and is preferably about 1:2 to 1:3. A person having ordinary skill in the art will be able to mix the gases in appropriate proportions so that the track torch 100 will operate in an efficient manner. Preferably the pressures of the combustible gas and combustion-enhancing gas are related to the movement of track torch 100 so that as track torch 100 moves the cutting operation may be maintained.

The torch 140 is mounted on an adjustable arm 146. Preferably the adjustable arm 146 allows the torch 140 to be positioned in a plurality of positions so that the torch tip 142 may be positioned having an angle of attack that lies between parallel and perpendicular positions with respect to the work piece. This allows the operator to select the appropriate angle of the cutting torch with relation to the speed of the relative movement of the cutting torch with respect to the work piece 114 and the thickness of metal. Generally, the smaller the angle of attack the faster the track torch 100 will be able to move and still maintain the cut. Additionally, the torch 140 is adjustable so that the cutting or torch tip 142 can be positioned closer to or further away from the work piece 114. Preferably the cutting torch is a straight barrel as opposed to an angled tip, but either will work.

A sleeve 150 holds the torch 140 in place. A torch lock 134 locks the position of the torch 140 into place with respect to the sleeve 150. The torch lock 134 has at least two positions, wherein a first position allows the torch to be moved with respect to the sleeve 150 so that the distance between the torch tip 142 and the work piece 114 may be varied. The torch lock 134 has a second position, which prevents relative movement between the sleeve 150 and the torch 140.

The sleeve 150 is adapted to be connected to a vertical arm 136. The vertical arm 136 fits within a sleeve 152 so that the distance between the horizontal arm 132 and the torch 140 may be varied. The sleeve 152 has a vertical lock 138 that has at least two operable positions. A first position allows relative movement of the vertical arm 136 with respect to the sleeve 152. In a second position, the vertical lock 138 restricts relative movement between the vertical arm 136 and the sleeve 152.

The sleeve 152 is operably connected to the horizontal arm 132. The horizontal arm 132 is operably connected to a sleeve 154. A horizontal lock 126 has at least two operable positions. The first position of the horizontal lock 126 allows relative movement between the horizontal arm 132 and the sleeve 154 It also has a second position that restricts relative movement between the horizontal arm 132 and the sleeve 154. By adjusting the horizontal arm 132 the torch may be positioned closer and further away from the track torch 100. The adjustable arm 146 is operably connected to the track torch 100. In operation, there is relative movement between the track torch 100 and the work piece 114. The adjustable arm 146 and the torch 140 move relative to the work piece 114. Additionally, the adjustable arm 146 may be mounted to the track torch 100 through a pivot mount. The pivot mount allows the adjustable arm to be rotated so that the cutting torch 140 may be positioned around the track torch 100.

The track torch 100 preferably has an electric motor 102, which is powered through an electric cord 104. The electric motor 102 drives wheels 108 so that the track torch 100 may move relative to the track 112 and the work piece 114 while the cutting torch 140 makes the cut 116 in the work piece 114. The wheels 108 may be connected through casters 118 or other drive mechanisms so that the wheels 108 may pivot with respect to the body 106.

Preferably the track torch 100 rides on a straight track so that the cutting torch 140, when in operation, cuts a straight cut 116 in the work piece 114. Alternatively, if an arcuate shape is desired, the track torch will follow the path of an arcuate track and the cutting torch will be parallel to the movements of the body 106 of the track torch 100. Thus, a track of an arcuate shape will result in a cut of an arcuate shape if the torch 140 is held in a fixed position. Gas pressure and torch position adjustments should be made so that the desired cut, gouge, scarf, bevel, or wash cut is maintained.

In order to facilitate the cutting operation, the track torch 100 may have pressure control regulators so that the operator can detect the pressures of the combustion-enhancing gas and combustible gas flowing to the cutting torch 140. A speed control knob 120 is preferably connected to the track torch 100 so that, based on the pressures of the gases and the angle of the cutting torch 140, the track torch 100 may move along track 112 at an appropriate speed so that the cutting torch 140 efficiently cuts the work piece 114. A switch may control operation of the electric motor so that in one position the electric motor engages the wheels 108 and the track torch 100 is driven down the track 112 and a second position so that the electric motor is off or disengaged from the wheels 108 so that the wheels 108 are not driven by the electric motor 102. Additionally, a gas cut-off valve can be activated through a release lever 124 that may be installed to stop the flow of at least one gas to the cutting torch 140. As mentioned earlier, the track torch 100 preferably has a supply of combustible gas and combustion-enhancing gas.

In another embodiment of the invention, sensing mechanisms may be added to the track torch so that if a desired cut is lost or about to be lost the track torch slows itself so that either the cut is reestablished or the operator is notified of the lost cut and can make the necessary adjustments. Such devices are well known in the art and are disclosed in U.S. Pat. No. 2,514,302 which is herein incorporated by reference, as well as others discussed below.

In operation, a person having ordinary skill in the art will set up the track 112 in a desired position and place the track torch 100 on the track 112. The operator positions the work piece 114 at a desirable distance away from the track 112 so that the torch 140 will cut the work piece 114 along a desired path. Preferably the operator will adjust the position of the torch on the adjustable arm 146 so that a desired cut may be made. The operator positions the angle and the distance between the torch 140 and the work piece 114. Based on these adjustments, the operator will adjust the speed of the track torch 100 relative to the work piece 114 so that the position of the torch 140, the speed of the track torch 100 and the gas pressures cooperate so that a cut in the work piece 114 may be made. Any further adjustments to the track torch or speed can be made when the cutting torch is ignited to pre-heat the cut 116. Upon proper pre-heating, the electric motor 102 will be engaged so that the wheels 108 propel the track torch 100 down the track. As the track torch 100 is propelled down the track, the cutting flame 148 cuts the work piece 114 with high pressure combustible and combustion enhancing gases so as to cut the metal at speeds preferably greater than two feet per minute up to speeds of at least 30 feet per minute. In order to ensure an efficient cut, the operator selects a speed, gas pressures, position of the torch tip size corresponding to the thickness of work piece 114, and the desired curve or lack thereof. A person having ordinary skill in the art will be able to increase the maximum track torch speeds from about 16 inches per minutes to speeds of at least about 30 feet per minute with a preferred track torch speed between about five and twenty feet of cut per minute.

Figure 5:
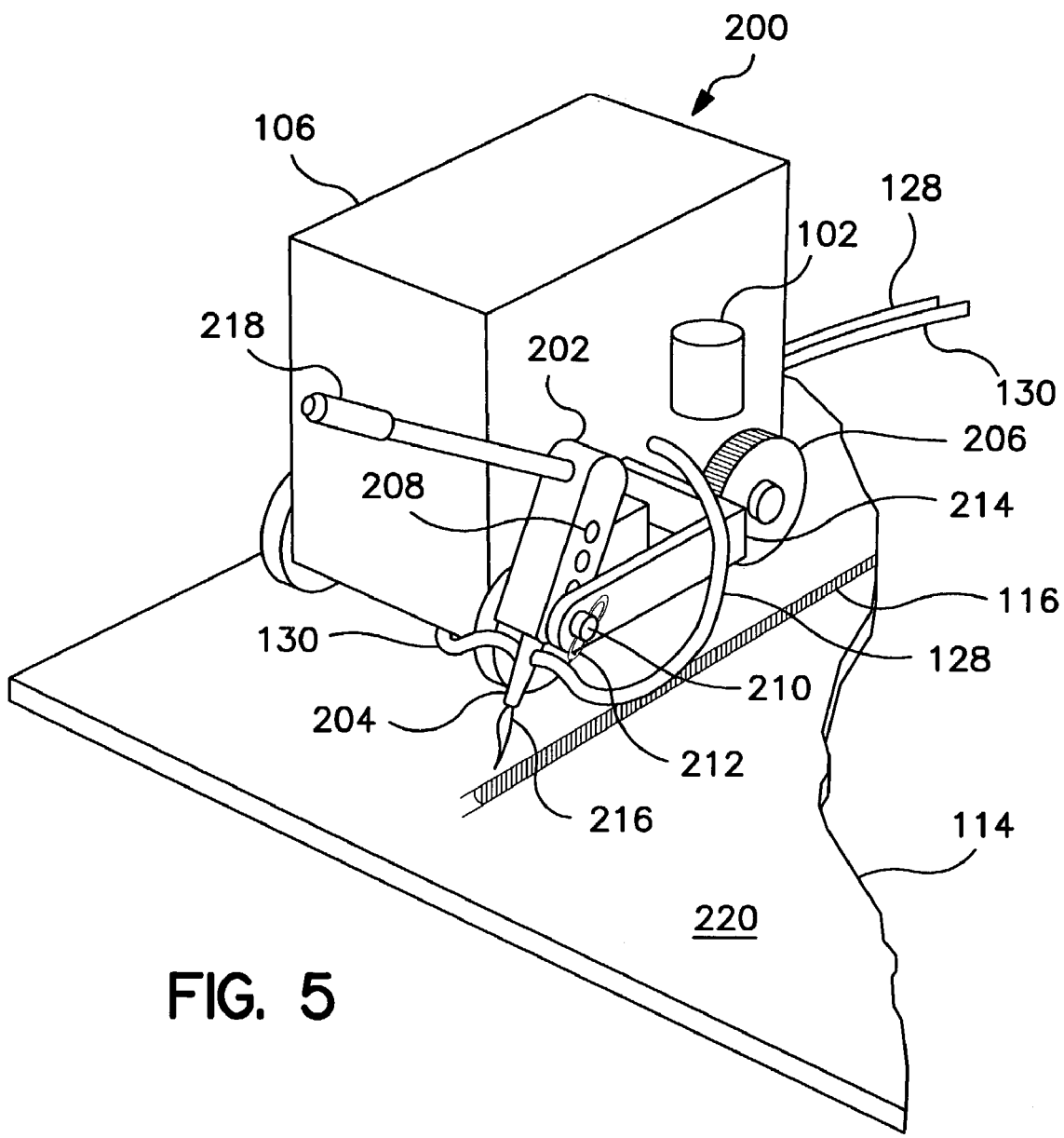
FIG. 5 is a perspective view of a self-propelled cutting torch.

In another embodiment of the invention as shown in FIG. 5, a self-propelled cutting torch 200 can be used to cut metal using the techniques described herein. The self-propelled cutting torch 200 has a body 106 that is connected to wheels 206 which are driven by an electric motor 102. The combustion-enhancing gas 128 and combustible gas 130 are supplied to the self-propelled torch 200. An adjustable torch 202 is rotatable about a pin 210 and the distance between a cutting tip 216 and a work piece 114 may be adjusted by moving the pin 210 between pin openings 208. Thus, an angle of attack may be adjusted from about 0° to about perpendicular with the work piece 114 and an adjustment lever 218 may be used to position the adjustable torch 202 at an appropriate angle of attack and distance between the cutting tip and the work piece 114. The adjustable torch 202 is mounted to the body 106 of the self-propelled cutting torch 200 by a cantilever frame 214.

In order to propel the self-propelled cutting torch 200, an electric motor operably engages the wheels 206. The wheels 206 frictionally engage with the work piece surface 220.

The self-propelled cutting torch 200 may also be attached to preferably angled or vertical surfaces through a magnetic system that is well known. The magnetic system causes the self-propelled torch 200 to adhere to the work piece 114, for example, the side of a ship; however, movement of the self-propelled cutting torch 200 with respect to the work piece still occurs so that the cutting torch 200 cuts the metal. Magnetic attachment systems are disclosed in U.S. Pat. Nos. 5,562,043 and 5,811,055 that are herein incorporated by reference. In an additional embodiment of the invention, the self-propelled cutting torch 200 may have a mechanical device to allow it to turn as in U.S. Pat. No. 5,693,286 which is also incorporated herein by reference. In still another embodiment of the invention, any of these embodiments may be equipped with an automatic lighting system as disclosed in U.S. Pat. No. 4,433,358 which is herein incorporated by reference. In yet another embodiment of the invention, this device may be used to cut beveled edges on pipes in a method disclosed in U.S. Pat. Nos. 4,202,535 and 4,135,701 that are herein incorporated by reference.

Referring now to FIG. 6, a robotic arm cutting torch 300 cuts a piece of metal. The robotic arm cutting torch 300 has a plurality of segments interconnected to a base 312. The base 12 is preferably connected to the robotic arm by a base rotator 314 that can rotate about 360° for a full range of motion. In another embodiment, the robot arm is connected to a motive device like a tracked vehicle. A robotic arm segment 316 is connected to the base rotator 314 at a first end through a robotic arm hinge 318. On a second end of the robotic arm segment 316, a robotic arm segment 326 is connected to the robotic arm segment 316, so that the robotic arm segment 326 may pivot about 360° about a robotic arm hinge 324. The robotic arm segment 326 is connected on a second end to a robotic arm hinge 322. The robotic arm hinge 322 is connected to a robotic arm segment 328 on a first end so that the robotic arm segment 328 may pivot approximately 360° about the robotic arm hinge 322. The robotic arm segment 328 is connected on a second end to a rotatable head 320. The rotatable head 320 can move preferably about 360° so as to rotate cutting torch 110 to any position. The cutting torch 110 is connected to combustion-enhancing gas and combustible gas lines 128 and 130. Additional segments can be added to the robotic arm cutting torch as needed so that movements of the robotic arm are fluid and that the robotic arm may reach any position of a work piece placed on a cutting table 310. The cutting table 310 is supported by table legs 306. A robotic arm control system 304 is well known by a person having ordinary skill in the art. The control system 304 is preferably a microprocessor, a personal computer, or a CNC machine. Preferably, the control system 304 is a CNC machine which can control all the movements of the robotic arm cutting system including segments 316, 326 and 328 as well as the cutting torch 110 so that cutting torch 110 may be moved from an about perpendicular position with a surface 308 of the cutting table 310 to an about parallel position with the work piece. With a jointed arm as shown in FIG. 6, the robotic arm cutting torch may cut steel according to a preferred embodiment of the invention. The robotic arm cutting torch may have at least one ball and socket joint to give a different range and fluidity of motions.

The control system 304 is capable of controlling the robotic arm movements as well as regulating the pressures flowing through the combustion-enhancing gas line 128 and the combustible gas line 130 so that pressures may be varied over the entire disclosed range as needed by the cutting torch in making its variety of cuts. By regulating the pressures in conjunction with the movements of the robotic arm, the control system 304 can maintain a cut while increasing cutting speed or precision. The control system 304 is preferably capable of moving the cutting torch tip from a vertical position wherein more control of the cut may be had, to a generally horizontal position where the cut in the workpiece made be made faster with straight line cuts. Additionally, the robotic arm may pick up different cutting devices so that it may perform gouging, cutting or beveling in a more efficient manner. Pre-programmed patterns may be input into the control device so that the robotic arm will trace or cut a pattern in the work piece. A person having ordinary skill in the art will be able to program the control device so that the robotic arm cutting torch 300 will change the position of the cutting torch 110 to make sharp corners, straight cuts, or rounded arcuate shapes. Additionally, sensors may be added to the robotic arm cutting torch 300 to form a feedback loop so that the control system can determine whether or not a good cut was made into the work piece and whether or not to slow down, speed up or repeat any portions of the cutting program. The sensors will be discussed in more detail below.

As shown in FIG. 7, a single carriage cutting torch 400 moves along a carriage track 406 on the cutting table 310 supported by the legs 306 and with the support surface 308 for the work piece. The single carriage cutting torch 400 is mounted on a plurality of carriage wheels 404 that ride along carriage track 406. At least one carriage motor 412 is attached to a single carriage cutting torch. Preferably one carriage motor 412 is attached to each side of the single carriage cutting torch 400. By attaching one carriage motor 412 on each side and coordinating the movements through a control system, torsion created by driving the single carriage cutting torch on only one side is avoided. The single carriage cutting torch 400 has at least one carriage 402 driven by a carriage motor 412 to propel it up and down carriage track 406 creating relative movement between the carriage cutting torch 400 and a work piece 424. The carriage 402 is connected to a carriage frame 414. The carriage frame 414 is connected to a beam 416. The beam 416 is operationally configured to a support elevator 418. The elevator 418 can traverse the length of the beam 416 on beam traverse mechanism 420. An elevator mechanism 422 elevates and depresses the elevator 418 thus positioning the cutting torch 110 closer or further away from the work piece 424. A hinge 426 is operably connected to the elevator 418 and controlled by a control system so that the elevator segment 428 which is connected to the elevator 418 through hinge 426 can move from a first position 408 into a second position 410 depending on the programming of the control system and the method used to cut the work piece 424. The elevator segment 428 is mechanically connected to the cutting torch 110 through a rotatable head 320. The rotatable head 320 allows the cutting torch 110 to pivot through 360°. In an alternative embodiment of the invention, the hinge 426 or rotatable head 320 is replaced with a ball and socket joint.

The single carriage cutting torch is preferably designed for straight line cutting for cuts parallel to carriage tracks 406 and for cuts transverse to carriage tracks 406. Additionally, the single carriage cutting torch may corner and create arcuate shapes by having a control system operate the beam traverse mechanism and carriage motor 412 generally simultaneously. For example, as the single carriage cutting torch 400 moves up and down along carriage track 406, movement by the beam traverse mechanism 420 will create an arcuate shape. Similarly, while the cutting torch is moving along beam traverse mechanism 420, if the carriage 402 moves, then an arcuate shape may be created. One way to prevent an arcuate shape is if the carriage 402 or beam traverse mechanism 420 comes to a complete stop before the other one is operated. By moving the cutting torch 110 while coordinating carnage and transverse movement, arcuate shapes are easily formed.

Figure 8:
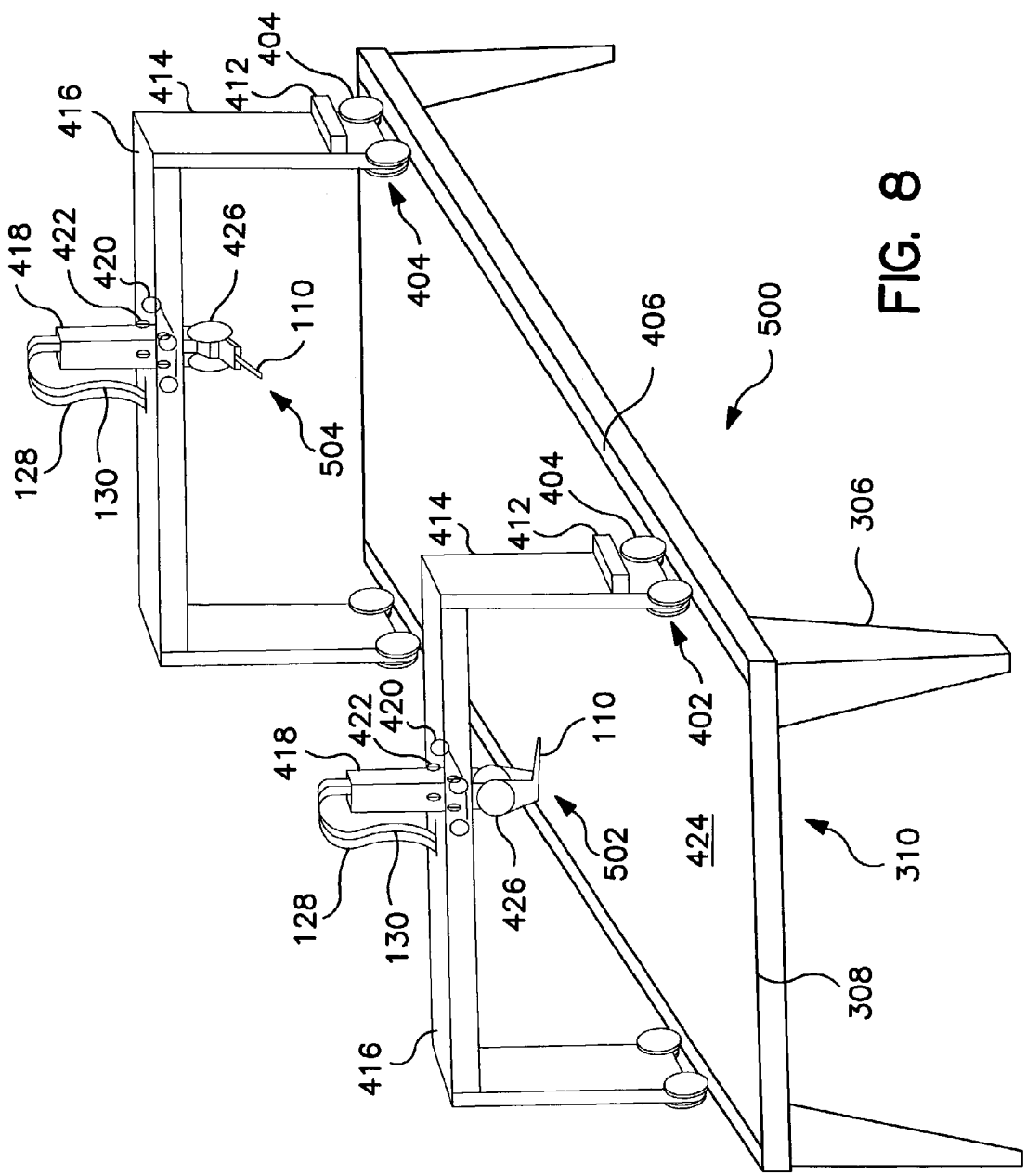
FIG. 8 is a perspective view of a dual carriage cutting torch.

In another embodiment of the invention as depicted in FIG. 8, a dual carriage cutting torch may be provided. A x-direction cutting torch 502 and a y-direction cutting torch 504 are generally similar to the single carriage cutting torch described above. Both torches 502 and 504 move on at least one carriage 402 which has a carriage motor 412, and wheels 404 which ride upon carriage track 406. The carriage 402 is connected to a frame 414 that is connected to a beam 416: The elevator 418 is operationally connected to the beam 416 and the beam traverse mechanism 420 so that the elevator 418 may move across the length of the beam. The elevator 418 may be raised and lowered so that the cutting torch 110 is raised and lowered closer or farther away from the work piece 424. The elevator mechanism 422 controls the vertical movement of the elevator 418. The elevator 418 is connected to the cutting torch 110 preferably through a hinge 426 or ball and socket mechanism so that cutting torch may be moved between a generally low angle of attack to a generally high angle of attack. The cutting torch 110 is operationally connected to combustion-enhancing gas source 128 and combustible gas source 130.

The dual carriage cutting torch system is optimally designed for bi-directional cutting. One cutting torch, the y-direction cutting torch 504, would preferably make all cuts parallel with the cutting track. Whereas, the x-direction cutting torch 502 would make all cuts transverse to cutting track 406. If any arcuate shapes needed to be made in work piece 424, either torch 502 or 504 would be capable of making those arcuate cuts.

The control system for this automated cutting torch would be similar to the control system of the single carriage cutting torch except that a control system would have to coordinate the movements of two cutting torches which would require special attention whenever one passed the other. In the alternative embodiment of the invention, both cutting torches 502 and 504 could cut both in the x-direction and in the y-direction; however, the control system would have to coordinate their movements so that the torches did not have conflicting paths when cutting. The coordination of multiple torches is well known in the art.

Figure 9A:
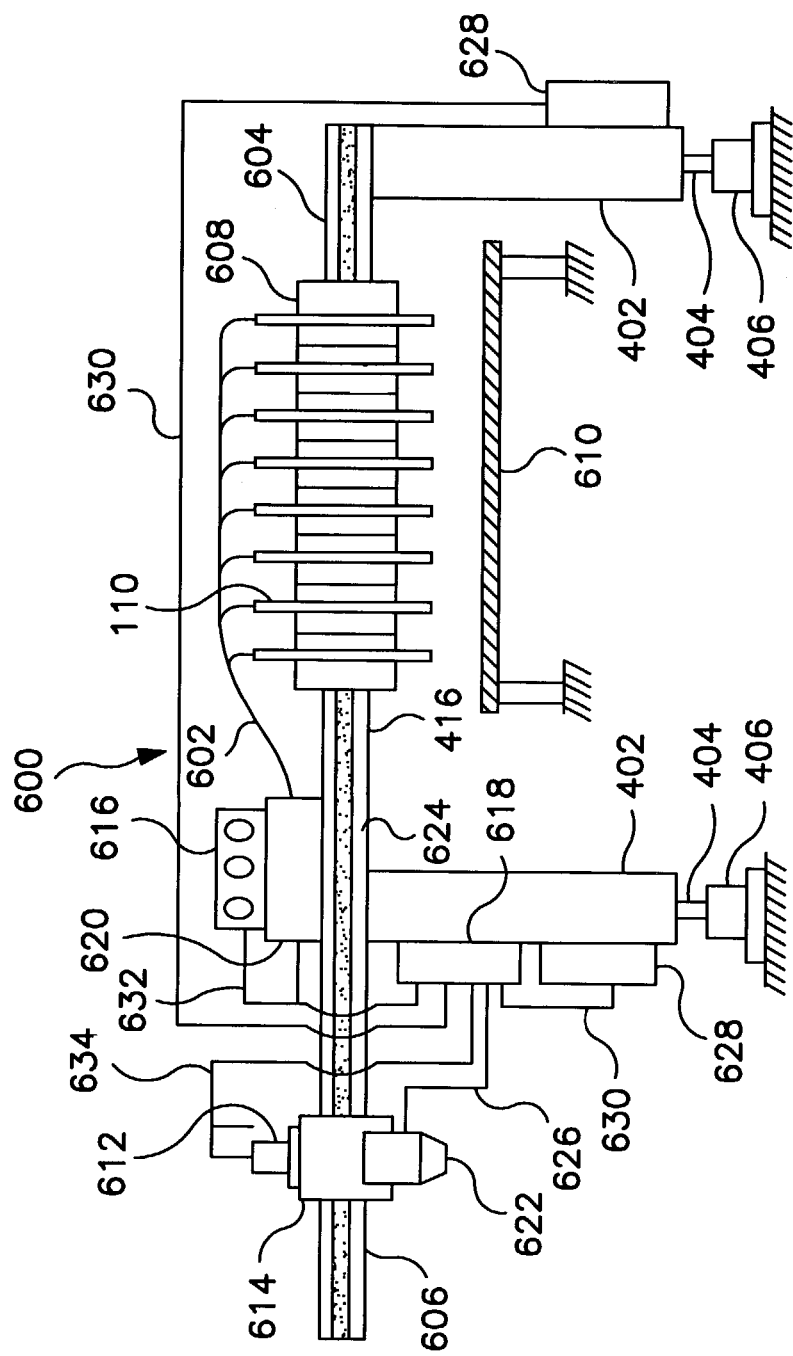
FIG. 9a is a diagrammatic view of a shape cutting apparatus.
Figure 9B:
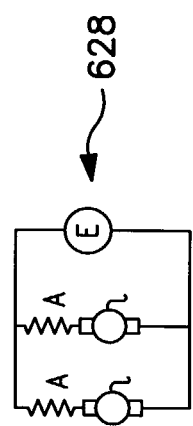
FIG. 9b is an electrical schematic of the power system for the dual parallel servo motors.

Referring now to FIGS. 9a and 9b, illustrated therein is a preferred embodiment of a shape cutting apparatus 600 which includes a pair of carriages 402 which will be described in greater detail herein below. The wheels 404 are provided with the carriages 402 with such wheels being mounted for translation along the rails 406. The transverse beam 416, which is rigidly mounted on extended cross carriages 402, includes a bridge portion 604 and a cantilever portion 606. Torch holder assemblies 608 which may include conventional devices for supporting a plurality of oxygen-fuel cutting torches 110 above a metal plate 610 are mounted for translation along the length of the transverse beam 416. A servo motor 612 is provided to drive a tracer holding assembly 614 in response to signals provided from a control device 616 and a servo amplifier 618.

In addition, a suitable hose assembly 602 is adapted to supply combustion enhancing gas, preferably oxygen, combustible gas or fuel, and any necessary coolant to torches 110 and is connected between such torches and the control device 616 and a gas control panel 620. The gas control panel 620 may be used to effectively regulate the pressures of the gases so that the machine can cut at high speeds in accordance with the preferred embodiment of the invention and may display a readout so that an operator may monitor them. A tracing assembly 622 is mounted on the cantilever portion 606 of the transverse beam 416 and is effective in a known manner to follow a line or edge on a template or pattern (not shown) positioned there below. The tracer holder assembly 614 is preferably mechanically connected to torch holder assemblies 608 by means of a band 624, which extends over the whole length of beam 416 and is driven by pulleys (not shown) in a conventional manner. The tracing assembly 622 is connected by a line 626 to the servo amplifier 618. It will be understood by a person having ordinary skill in the art that the torch holder assembly 608 may include means for raising and lowering torches 110 and further description thereof is not considered necessary. The torch holder assembly may also pivot so as to change the angle of attack between the cutting torches and the workpiece, i.e., metal plate 610.

In another embodiment of the invention, the torches may be rotatable about the transverse beam 416 so that the torches can cut the metal plate 610 at high speeds using high pressure combustible gas and combustion enhancing gas. By having cutting torches 110 repositionable between a high angle of attack and a low angle of attack with the metal plate 610 in conjunction with high pressure gases as described herein, faster cutting speeds may be achieved than previously attained with similar machines using low pressure gases which are typically 20 psi and 60 psi for combustible and combustion enhancing gases, respectively.

Dual side drive servo motors 628 are mounted on the carriages 402 respectively, and are effective to drive the wheels 404 along the tracks 406, in the longitudinal direction of travel of apparatus 600. The servo motors 628 are connected through resistances R in parallel with one another and across a source of electrical potential E as indicated in FIG. 9b. The connection is shown by means of connecting line 630 of connecting motor 628 to servo amplifier 618 which in turn is connected through line 632 to control device 616. The servo motors 628 are preferably coupled to the wheels 404 by suitable reduction gearing well known to those skilled in the art.

In operation, the tracing assembly 622 on the cantilever portion 606 of the beam 416 will begin to follow a line or edge on a template (not shown) and is effective to generate electrical signals representative of the position of such line or edge. The signals are supplied over a line 626 to the servo amplifier 618 after which the torches 110 are ignited, and will supply electrical signals to the servo motors 612 thereby driving the transverse beam 416 in a longitudinal direction and the torch holder assembly 608 in a transverse direction at a rate corresponding to the velocity of the tracing head 622 thereby causing the torches 110 to cut patterns in the plate 610 identical to the pattern or template followed by the tracer head 622. The cutting torches may be operated in a range of positions from either a generally perpendicular position through a generally parallel position relative to the metal plate 610. As the cutting torches move from the generally perpendicular position to the generally parallel position and/or as the gas pressures are increased to the torches 110 in accordance with the herein described method, the tracing head 622 may accelerate to faster tracing speeds. The cutting torches may be operated in unison or they may be operated independently. The torches can be started and stopped as necessary to get the required trace pattern.

In another embodiment of the invention, at least one sensor may be placed about a cutting torch so that a control device may determine if the tracing head 622 may accelerate and maintain higher velocities in tracing its pattern and still maintain its cut. If the tracing head 622 encounters a corner or curvature, the cutting torches may be controlled to follow the curvature on the metal plate 610. If the tracing head 622 encounters a curvature or corner, the cutting torches may be rotated. The mechanisms which allow this are well know in the art. In another embodiment the torches may be moved from a relatively small angle of attack to a comparatively greater angle of attack or vice versa. As the torches are moved the cutting speed of the torches will be slowed and a corresponding slowing of the carriages would preferably ensue. As the cutting torches finish the curvature and move to straight line cutting, the torches may then be moved to a relatively smaller angle of attack and the carriage devices accelerated to correspond with the new rate of cut by the cutting torches. The pressures of the gases may also be varied to better control the cut.

By utilizing the dual side drive servo motors 612 connected electrically and in parallel with one another, the transverse beam 416 is maintained in a square relationship with the carriages 402 and thereby enables the tracer head 622 to negotiate corners at a greater velocity for the same radius of curvature which is obtained by a single side drive systems only at substantially lower speeds. In an alternative embodiment of the invention a single carriage may be used to drive this mechanism. U.S. Pat. No. 4,194,727 is herein incorporated by reference.

Figure 10:
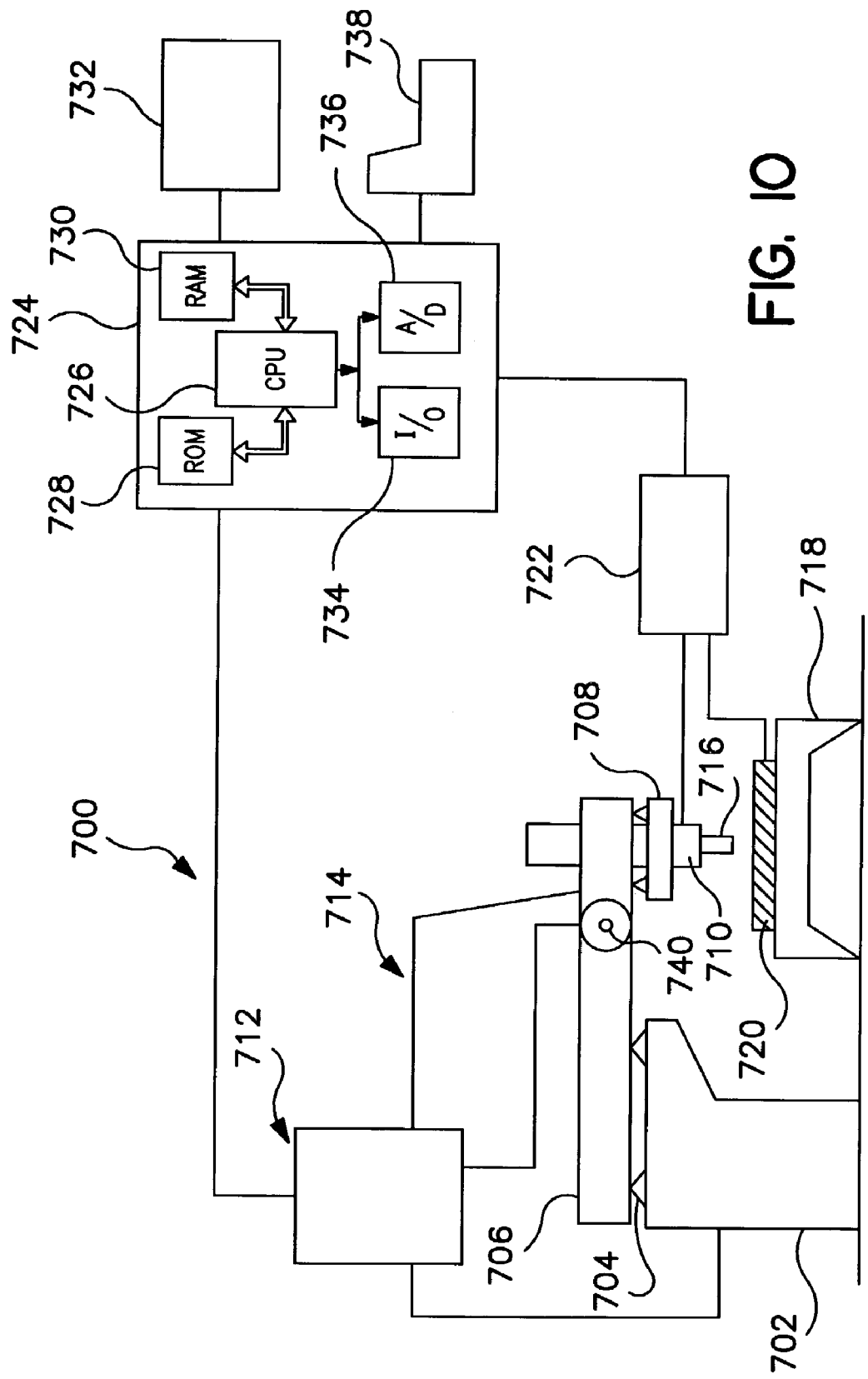
FIG. 10 is a schematic diagram of a cutting machine with sensors.

In FIG. 10, a cutting mechanism has a sensing device attached such as one disclosed in U.S. Pat. No. 5,470,047, which is herein incorporated by reference. A gas accelerated steel cutting apparatus with a sensor 700 comprises a cutting mechanism 714 which incorporates the accelerated steel cutting method described herein above, the cutting mechanism driver 712, a flame sensor 722, a microprocessor for control system 724 and input-output devices 732 and 738. Other sensors such as position sensors, temperature sensors, and pressure sensors are well known in the art and may be used to better control any of the herein described cutting machinery.

The cutting mechanism 714 includes a main body 702 having a guide member 704 at its upper portion, a first slider 706 movable along the guide member 704 to and fro, a second slider 708 movable along the first slider 706 in the direction of the right and left, and a torch 710 movable through the first and second sliders 706 and 708 upwardly and downwardly. The first slider 706 preferably has an articulated member 740 for adjusting the angle of the torch 710 so as to form an angle of attack with a work piece, i.e., a metal sheet 720. The metal sheet 720 is located under a tip portion 716 of a torch 710 on a bed 718. The cutting torch 710 is at an angle of attack between about 0 and about 90° so as to cut the metal sheet in accordance with the present invention.

These components of the cutting mechanism 714 are driven by the conventional cutting mechanism driver 712 which is responsive to control signals provided by the microprocessor 724 and may include a hydraulic system or a servo system actuated by an electrical control signal.

The flame sensors 722 detect the current flow through a flame formed between the torch 710 and the work piece 720, and generate a current sense signal which represents a voltage corresponding to the detected current and is coupled to the microprocessor 724. The microprocessor 724 can include a central processing unit (CPU) 726, a read only memory (ROM) 728, a random access memory (RAM) 730, and input-output (I/O) interface 734 and analogue digital (A/D) converter 736. The CPU 726 receives a current sense signal through the A/D converter 736 coupled to the I/O devices, e.g. computer aided design (CAD) system 732 and a control console 738 via the I/O interface 738. The CAD system 732 and a control console 738 via the I/O interface 734. The CAD system 732 and the control console 738, which are well known in the art, serve to generate cutting contour information and user setting information, respectively. The CPU 726 which is coupled to the cutting mechanism driver 712 via I/O interface 734 serves to receive the cutting contour information and the user setting information and to generate the control signal. The I/O interface may include a plurality of photo couplers (not shown) to serve to electrically isolate the microprocessor 40 from the cutting mechanism driver 712 having a high voltage drive source.

The microprocessor 724 has a numerical control function to control various operations of the gas cutting machine including discharging a combustible gas and a combustion enhancing gas at specific pressures to form a flame, controlling the torch home position, and controlling the movement of the components of the cutting mechanism 714 in accordance with the cutting information inputs from the CAD system 732 and the control console 738. The control console 738, as is well know in the art, may include a monitor and a keyboard for user interfacing. The microprocessor can control the position of the cutting torch with respect to the work piece 720. The cutting torch position can be simply determined by x-axis, y-axis and z-axis coordinates given by position sensors. The angular position of the cutting torch 710, including the angle of attack of cutting torch 710, may be controlled by the microprocessor 724. The microprocessor may also control gas pressures to the cutting torch, relative movement between the cutting torch and the work piece, complex linear and arcuate cutting patterns, ignition and extinction of the cutting flame, addition and removal of work pieces, the changing of the cutting tip and the changing of tools so that different cutting torches or tools may be connected to this mechanism to perform work on the work piece 720. It is well known in the art to control at least these actions as well as sensing the temperature and rate of cut of the cutting device through the microprocessor 724.

To start a cut at the edge of work piece 720, the preheat flame may be placed just about over the edge to heat the work piece 720. Preferably when the work piece 720 is heated to an about molten state, the combustion enhancing fuel is increased, and the torch 710 moves over the work piece 720. Therefore, the combustion enhancing gas cutting is accomplished through the use of the chemical reaction in which the preheated metal is cut, or removed by rapid oxidation in a stream of oxygen.

During the cutting operation, the combustion enhancing gas and combustible gas preferably flow through separate channels to the cutting torch 710 at pressures controlled by a pressure regulator (not shown) in accordance with the herein described method, which is provided in the cutting mechanism 714 and may be adjusted by the operator. The channels controlled by the pressure regulator serve to supply a gas mixture of a proper ratio for preheating and a high pressure gas stream for cutting to the torch tip portion. By adjusting or controlling the flow rate in the channels from the microprocessor 724, the operator can set the precise gas mixture desired. For machine cutting, gases are normally controlled by numerical control. Alternatively, a pressure sensing mechanism, which is well known in the art, may be attached to the accelerated flame cutting machine. The pressure sensing device feeds information to the microprocessor so that the microprocessor may adjust the position of the cutting torch relative to the work piece to allow for the most efficient cutting. Other sensing devices, for example temperature control, may also be used to improve cutting performance.

An accelerated flame cutting machine may also be provided having a CNC control with programmable memory wherein the memory is programmed to cause automatic cutting of pieces continuously in succession, and wherein the memory also includes selectively actuatable instructions to control the torches so that beveling, gouging or cutting may be performed. Additionally, a CNC control system would be useful in reestablishing a lost cut, as described in U.S. Pat. No. 4,466,069 which is herein incorporated by reference.

A CNC is of any well known type which is conventional in the metal cutting field and includes, among other things, a programming device which may include paper, magnetic tape or other data storage devices which pass over the usual pickup head section which in turn inputs to the memory unit of the CNC. See U.S. Pat. Nos. 4,014,495 and 4,121,808 for further details relative to the programmable numerical control devices. Those patents are herein incorporated by reference.

Figure 11:
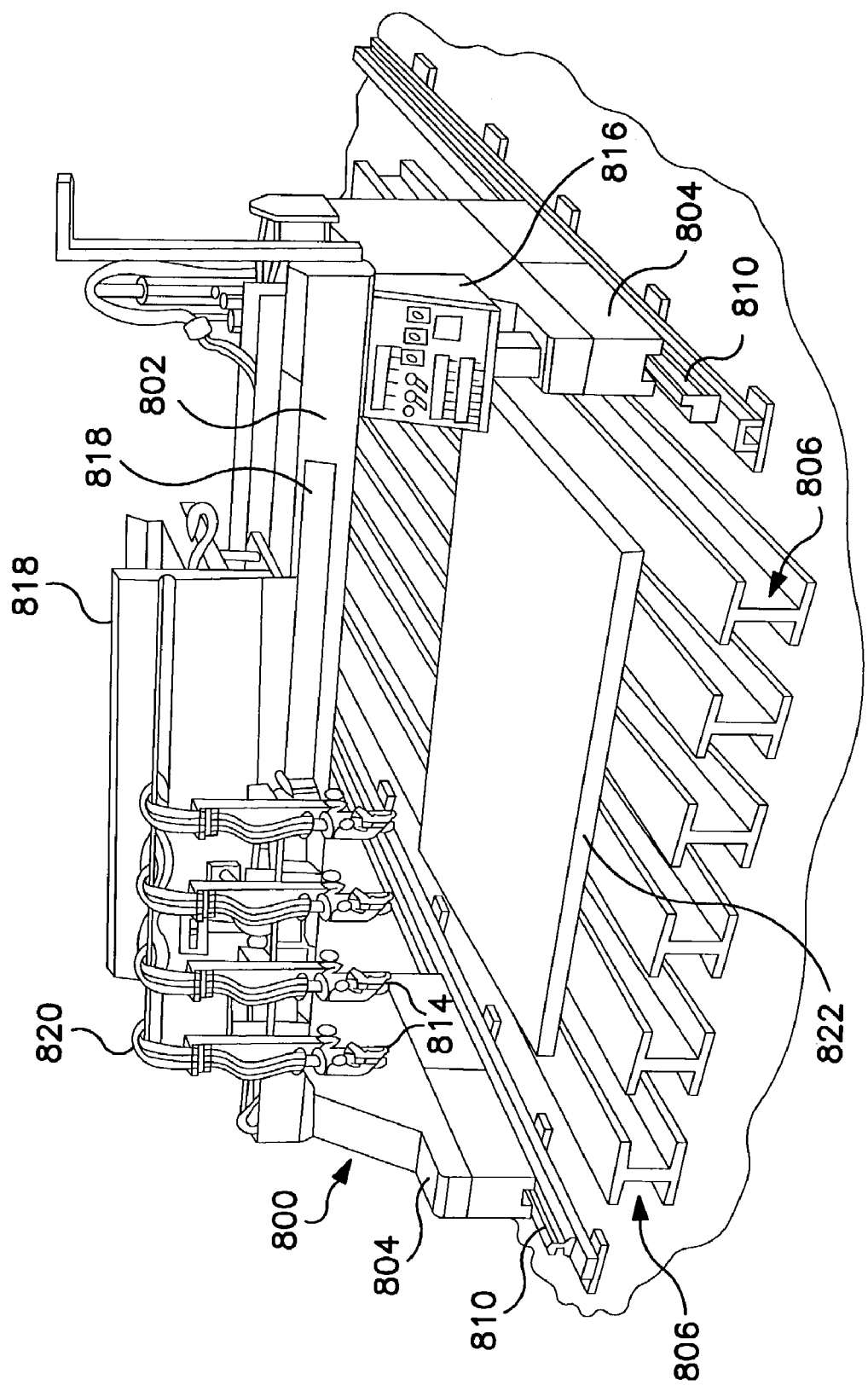

FIG. 11 shows an embodiment of the invention with an accelerated flame cutting apparatus 800. The flame cutting apparatus 800 has a bridge portion 802 that is suspended between two support gantries 804. Each of the support gantries 804 is mounted for movement along rails 810 so that a bridge portion 802 will pass over the top of a cutting table 806.

Also secured to the bridge portion 802 are a plurality of flame cutting assemblies 814 for use with the present invention. They are mounted for controlled movement laterally across the bridge. There are several conventional means of moving the flame cutting assemblies 812 across the bridge 802, such as a rack and pinion, an axially threaded rod with followers, or an endless steel band, all of which extend the length of the bridge and are controlled by gear motors which permit accurate positioning of the flame cutting assemblies 814 anywhere along the bridge member 802 in a manner well known in the art of numerically controlled flame cutting apparatus.

Motors that operate the traversing mechanism are controlled by the numerical control equipment. An input control panel 816 is generally used to program and operate the numerical control equipment so that the cutting assemblies 812 will move in a desired pattern. The flame cutting apparatus 800 illustrated in FIG. 11 is merely an example of the type of mechanism to which the accelerated steel cutting technology and method may be incorporated. The cutting table 806 may be conventional and can vary in design. It is usually a plurality of spaced parallel bars running transversely parallel to the bridge 802 longitudinally parallel to the rails 810. Another type of conventional cutting table consists of a plurality of pointed members extending vertically upwards so as to support the work piece in a horizontal position. Some spacers are usually provided between the support members forming the cutting table 806 and the bottom of the work piece since the flames from the cutting assemblies 812 often pass through the work piece. However, with the method and apparatus of the present invention, the flame does not cut as deeply as conventional cutting methods due to the angle of attack thus allowing a longer life for the cutting table, which further reduces costs.

Figure 16:
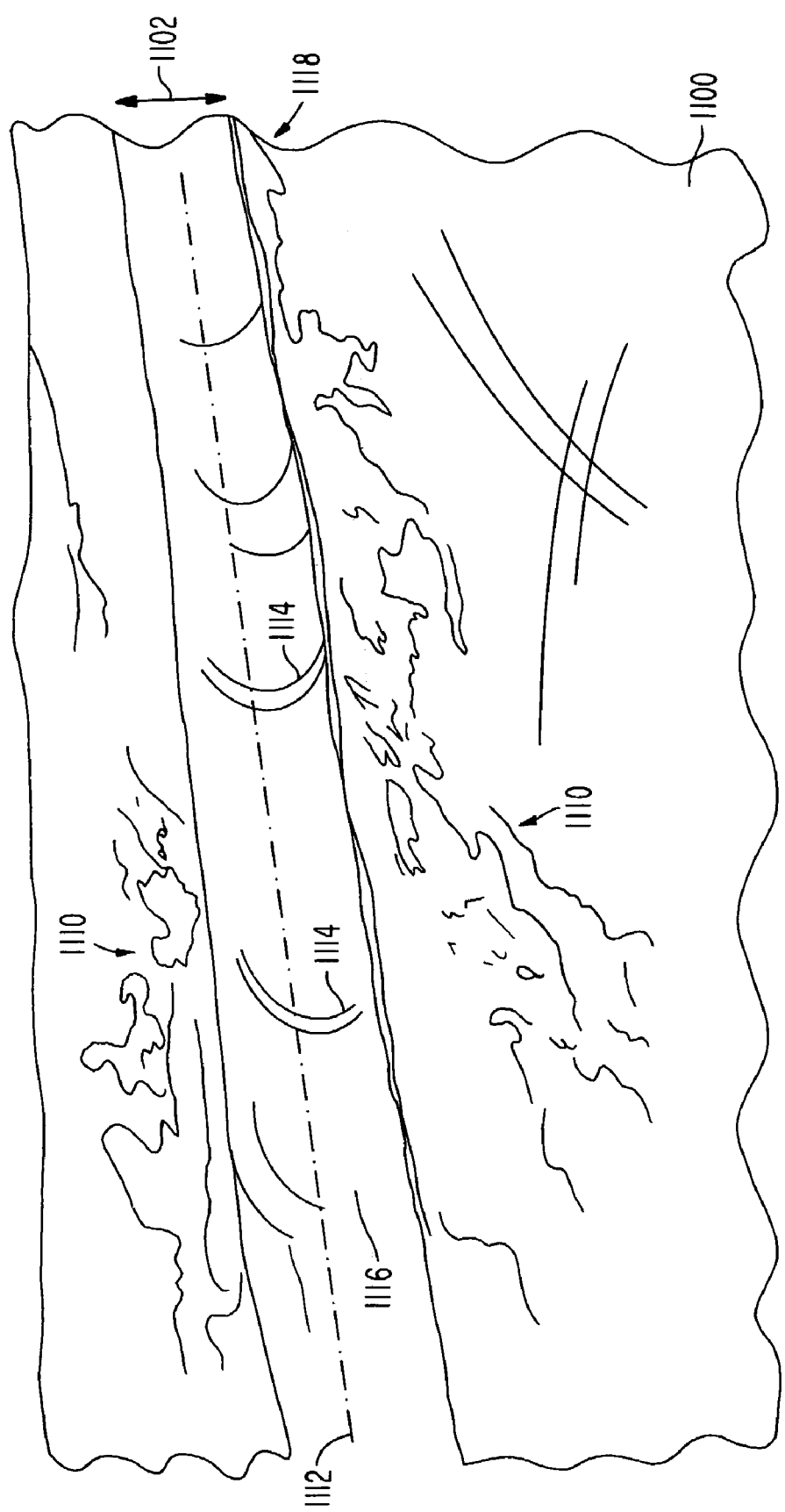
FIG. 16 is a perspective view of a piece of gouged metal.

FIG. 16 shows a product resulting from the present inventive method and apparatus. FIG. 16 shows cut metal 1100. The metal, even if heavily painted or rusted, may have a scarf or gouge 1118 formed therein. The gouge is formed by pre-heating the metal 1100 to an about molten state and applying high pressure gases to the about molten metal so that the about molten metal becomes fully molten and can be blown out of a cutting trench 1116 about a cut line 1112. The scarf or gouge 1118 is formed by moving the cutting torch at an angle of attack generally less than about 45°. The cutting torch is moved relative to the surface of the cut metal 1100 so that the scarf or gouge 1118 is formed in the cut metal 1100 at the appropriate depth. A smaller angle of attack results in a shallow gouge, while a big angle of attack results in a deeper gouge. The scarf or gouge 1118 is made in the metal 1100 by adjusting at least one of: the angle of attack of the cutting torch; the pressures of the combustion enhancing gas and/or combustible gas; the angle of the cutting torch and the distance between the cutting torch and the cut metal.

The scarf or gouge 1118 is characterized by a plurality of arcuate marks 1114 positioned generally transverse to cut line 1112. The arcuate grooves result from changes in the metal, adjustments in the rate of speed of the torch movement along the cut line 1112, changes in gas pressure, changes in the angle of attack of the cutting torch, and the distance between the cutting torch and the cut metal 1100.

As the cutting torch moves along cut line 1112, hot slag is pushed up and out of cutting trench 1116. The slag is pushed forward by the high pressure combustion enhancing gas so that a pool of hot slag is driven before the cutting torch. As the hot slag accumulates, the hot slag is blown away from the cutting trench by high pressure gas in accordance with the herein described method. As the combustion enhancing gas blows the hot slag in front of it, gravity, gas direction, pressure, and metal shape affect the hot slag to change the velocity and direction of the hot slag. As the slag is pushed out of the way of the combustion enhancing gas, the ambient air and torch gases, as well as the heat transfer properties of the metal, cool the hot molten slag thus causing it to solidify into a generally solid state on the metal. The resulting product is a piece of cut metal 1100 with a gouge or scarf 1118 formed thereon with cooled slag tracks generally emanating from the scarf or gouge 1118 formed in a generally arcuate 1110 or linear shape.

The slag, if on a painted or rusted surface, is relatively easy to remove and can be scraped off often with a gloved hand or the back of a cutting torch. Additionally, the slag may be removed with a grinder and other methods known in the art.

Not all slag is blown out of the cutting trench and left to reform on the metal. Due to gravity and the high pressure combustion enhancing gas, a lot of slag is blown away from the cut metal 1100. The scarf or gouge 1118 formed by a machine is characterized as being mechanically formed. This is in contrast to a hand held scarf or gouge wherein the sides and/or depth of gouge deviate because of the operator holding the cutting torch. By having the machine at least hold, if not control, the cutting torch, uniform cuts, gouges, and bevels are made. The cuts, gouges and bevels are not only consistent throughout their length (of course there are minor deviations in even a mechanical cut) but are also generally consistent from work piece to work piece if the mechanical settings are the same on the machines and the deviations resulting from the steel and environment are ignored.

Figure 17A:
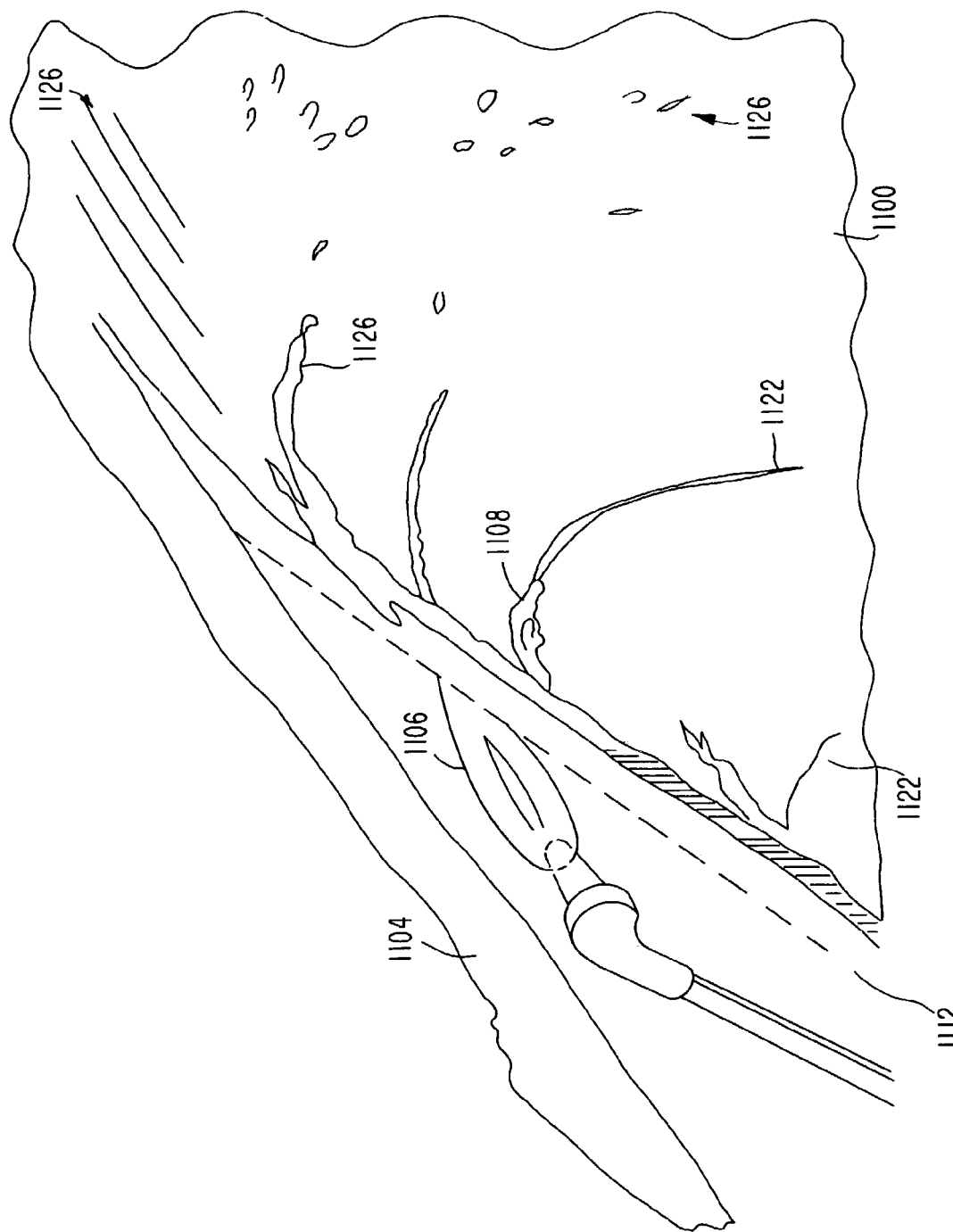
FIGS. 17a and 17b are perspective views of metal being cut according to the present invention.
Figure 17B:
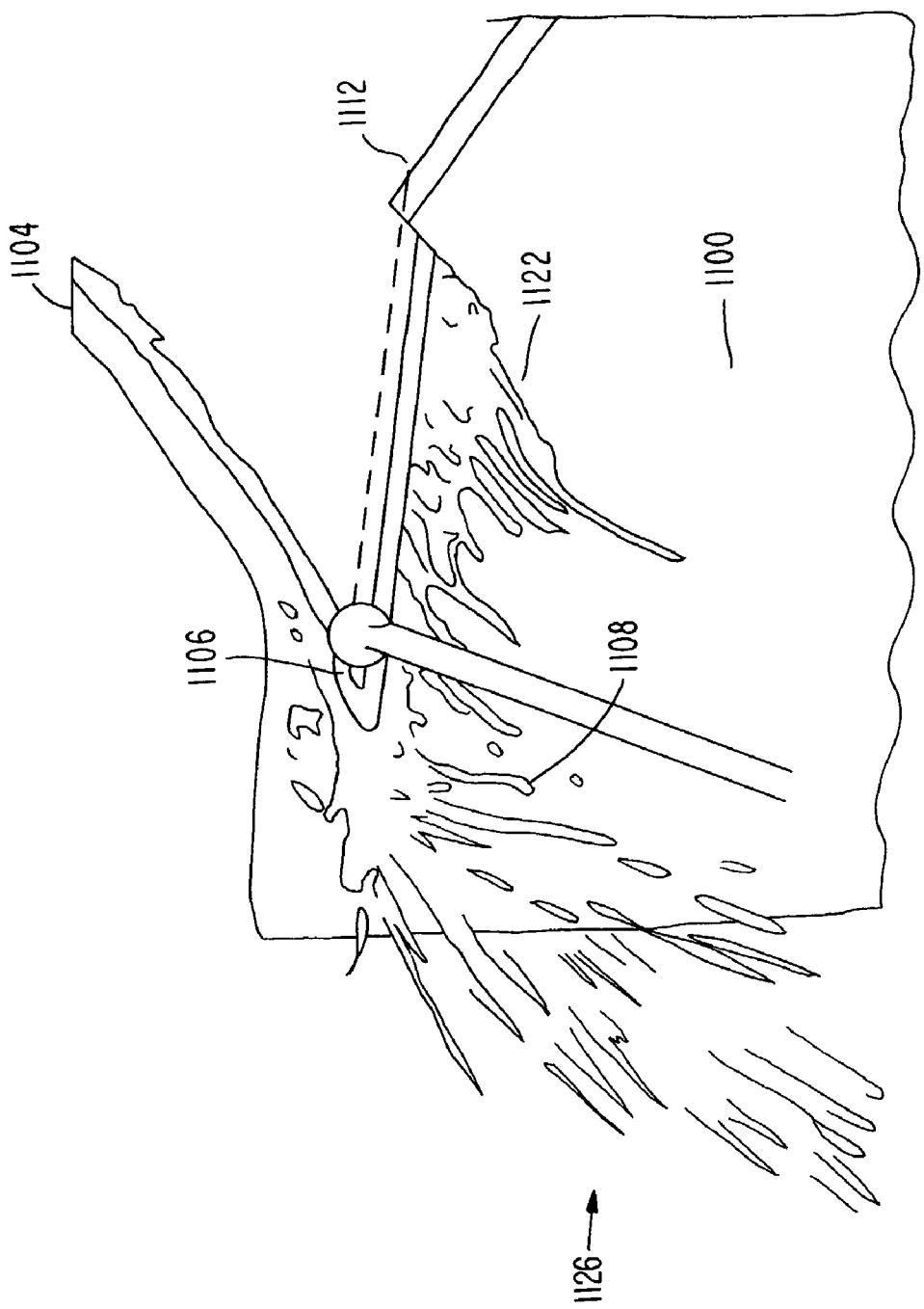

Referring now to FIGS. 17a and 17b, a similar freezing process happens when the cut extends completely through the metal as opposed to a gouge or a scarf in FIG. 16. Cut metal is formed by a cutting torch with flame 1106 applying heat to make the metal 1100 about molten. As the molten metal is blown with high pressure gases, the about molten metal turns completely molten and is pushed ahead of the high pressure gases. Hot slag is blown off the metal 1100 and generally flows away from high pressure gases. As hot slag 1108 pools in front of the gas, the hot slag affected both by gravity and the gas pressure, moves away from a cut line 1112 forming an arcuate path 1122 or a linear path. If the piece of metal on one side of the cut line 1112 is small enough, the metal warps away from the cut line forming warped metal 1104. Some of the hot slag 1108 will come off in a pool or a stream whereas other pieces of hot slag are blown away as small semi-molten or molten beads or drops 1126. FIG. 17*a* shows the back side of metal 1104 cut by the present invention. FIG. 17*b* shows the front side of the metal 1104.

Figure 18:
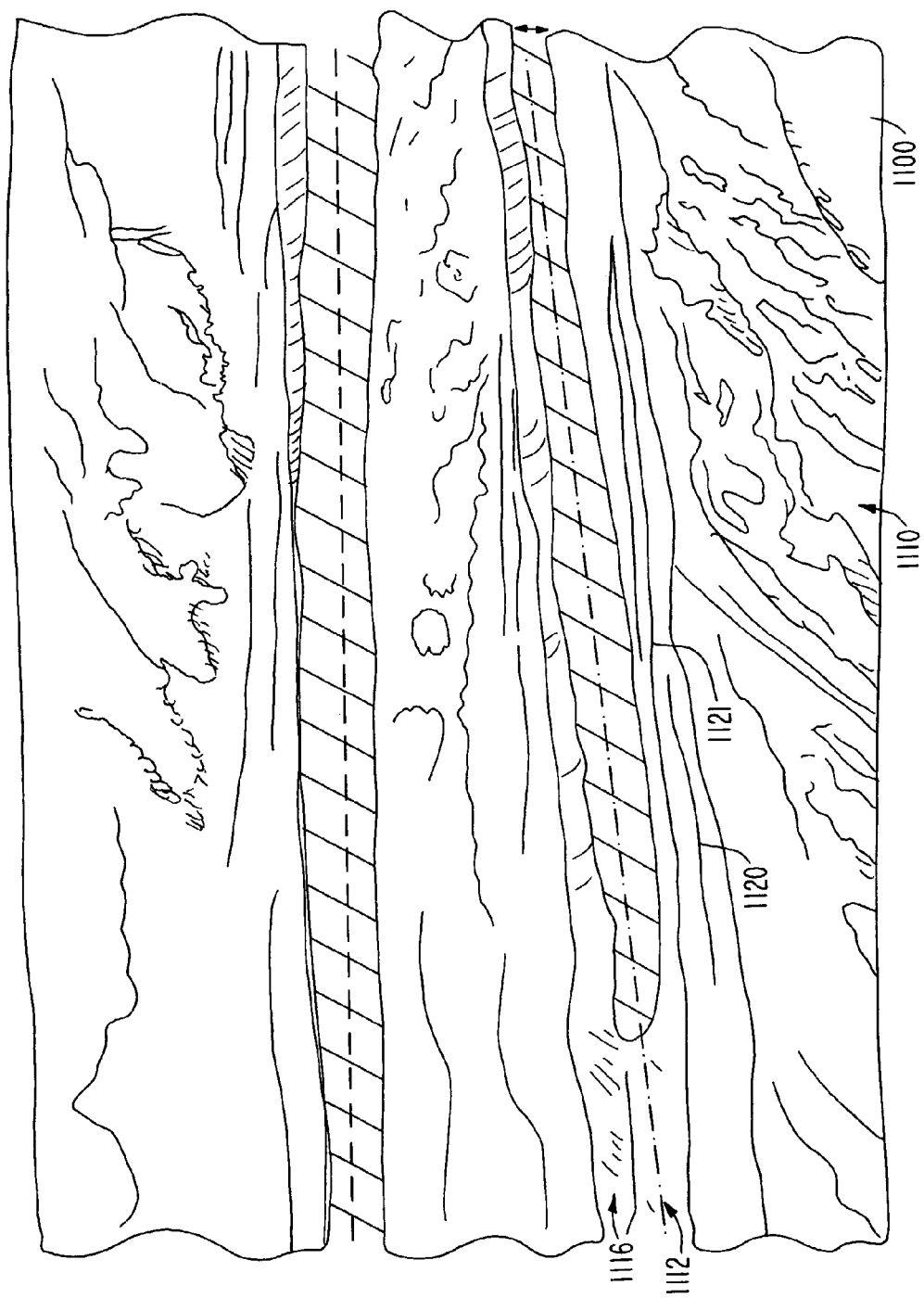
FIG. 18 is a perspective view of a cut piece of metal which has been cut according to the present invention.

Referring now to FIG. 18, cut metal 1100 is shown after all the molten metal has cooled and solidified again as solid metal, and cooled slag 1110 is formed about imaginary cut line 1112. When the cut metal 1100 is cut all the way through it thickness, rounded edge linear grooves 1121 on rounded edge 1120 may be formed along the walls of the cutting trench 1116 about the cut line 1112. The kerf 1102 of cut line 1112 is the width of metal that is removed as a result of the cut. On a painted surface, the cooled slag generally does not completely adhere. The same is generally true for a rusted surface. However, when the steel is clean or new, the cooled slag generally tends to adhere relatively more to the clean or new steel. Often the cooled slag 1110 may be removed with a gloved hand, a scraping device or the back of the torch. In either case, grinding removes the steel from the surface. This improves the clean up time needed to prepare the metal for welding or painting.

Figure 19:
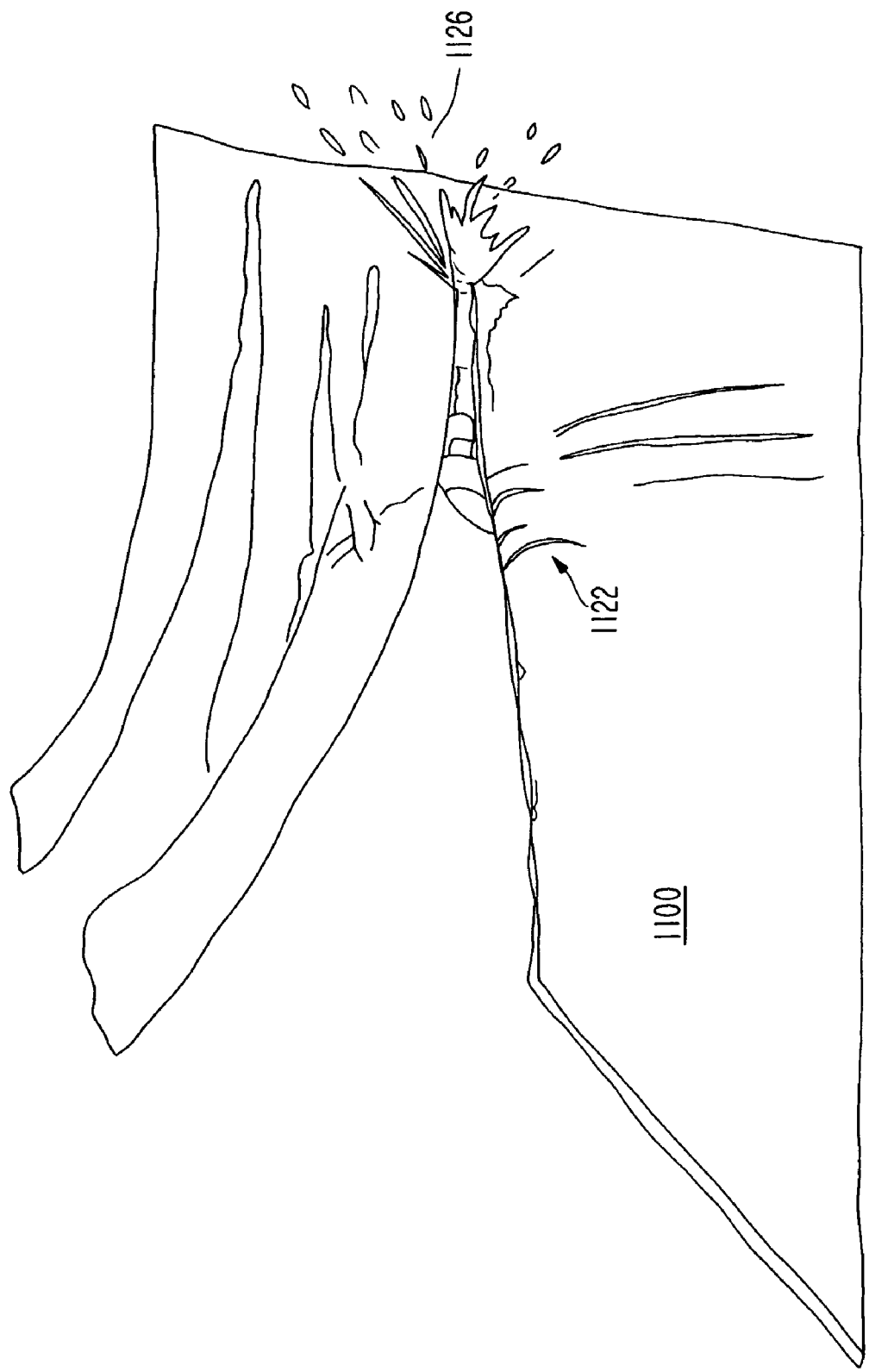
FIG. 19 is a perspective view of the reverse side of a piece of metal being cut according to the present invention.

Referring now to FIG. 19 which shows the back side of a piece of steel, one can see that slag may come off the back side when a cut goes through both sides of the cut metal 1100 The same arcuate paths 1122 and the molten beads 1126 come off the back side but are generally less in volume than on the front side. Due to the high pressure, the molten metal, which forms part of the side of the cut metal 1100 furthest away from the cutting torch, is blown out on the back side when the metal becomes molten and in contact with the high pressure gases as described herein above.

Referring now to FIG. 1, a work piece 1200 is shown cut in two pieces about a cut line 1210 by a machine described hereinabove. The work piece has two sides 1220 or surfaces. An edge 1212 connects the two sides 1220. The separation difference between the cut edges of work piece 1200 is the kerf 1218. The kerf 1218 as described above is determined by a multitude of factors so that the kerf can be maximized or minimized as the situation dictates. It also should be noted that cut edge 1212 is approximately straight. An operator may induce a slight bevel 1214 on the edge 1212. The extent of the bevel is determined by the many factors including torch position, torch tip size, angle of attack, gas pressures, and speed of the cut. The edge 1212 typically has a visible grain pattern; however, in certain situations there is no visible grain pattern on the edge 1212.

Figure 2A:
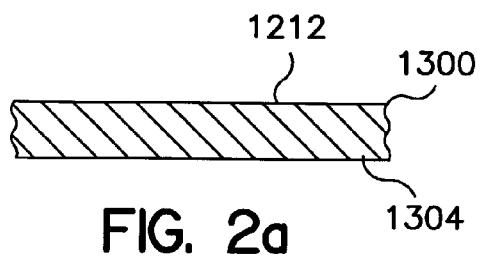
FIG. 2a is an elevation view taken along section lines I—I of FIG. 1 showing an example of a diagonal grain on a work piece cut by the present invention.
Figure 2B:
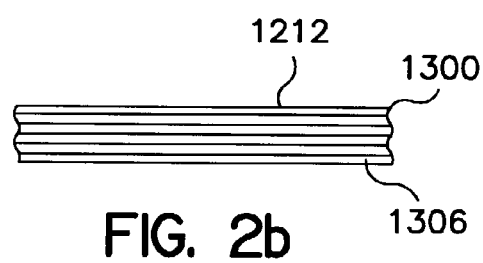
FIG. 2b is an elevation view taken along section lines I—I of FIG. 1 showing an example of a horizontal grain on a work piece cut by the present invention.
Figure 2C:
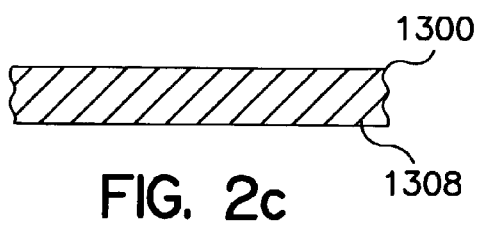
FIG. 2c is an elevation view taken along section lines I—I of FIG. 1 showing another example of the diagonal grain of a work piece cut by the invention.
Figure 2D:
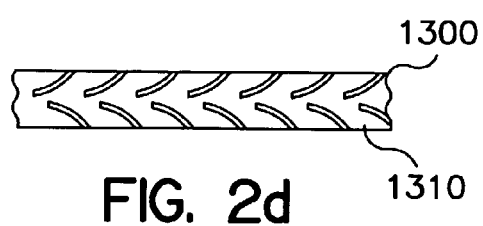
FIG. 2d is an elevation view taken along section lines I—I of FIG. 1 showing an example of a bi-directional grain of a work piece cut by the invention.

FIGS. 2*a*–2*d* show the cut edge face 1216 taken along section lines I—I of FIG. 1. FIGS. 2*a*–2*d* show possible grain patterns in the cut metal 1200 using the present invention. The product shown in FIGS. 1–2*d* is distinguishable from the prior art product shown in FIGS. 3*a*–3*b*.

In the present invention an operator can produce a diagonal grain 1304 or 1308 (see FIGS. 2*a* and 2*c*). The grain is on a diagonal because the cutting torch is positioned above the workpiece 1200 and the cutting torch flame is at an angle of attack as disclosed by the present invention. The angle of the diagonal grain 1304 and 1308 will depend on many factors including the angle of attack, the gas pressures, the tip size, the thickness of the metal, the type of metal, the speed of the cut and the distance between the cutting tip and the metal. In certain situations, typically when gas pressures are high and the pressurized gases are directed about parallel to the cut edge, a parallel grain pattern 1306 will be formed on the cut metal piece (see FIG. 2*b*). The parallel grain pattern 1306 is generally parallel to the edge 1212. Alternatively, a divergent grain pattern 1310 may be formed as shown in FIG. 2*d*.

Figure 3A:
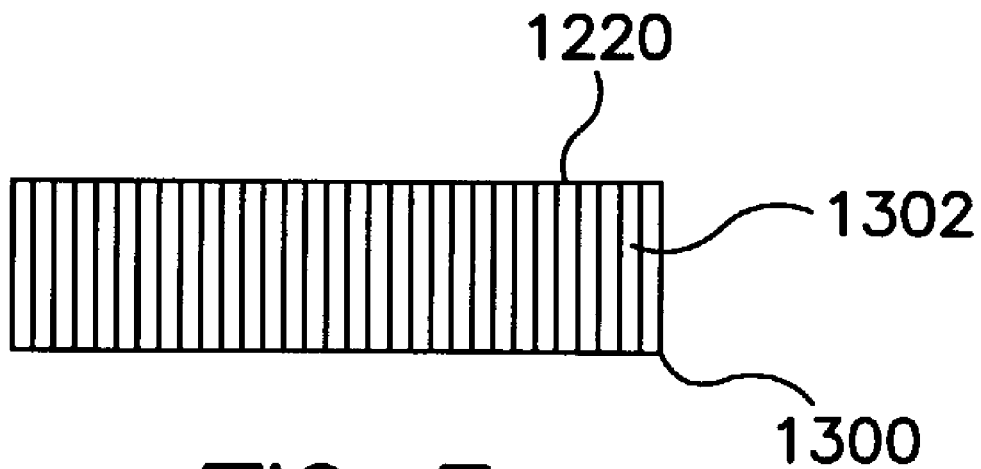
FIG. 3a is an elevation view taken along section line II—II of FIG. 3b showing a cut edge of a work piece cut by prior art methods or machines.
Figure 3B:
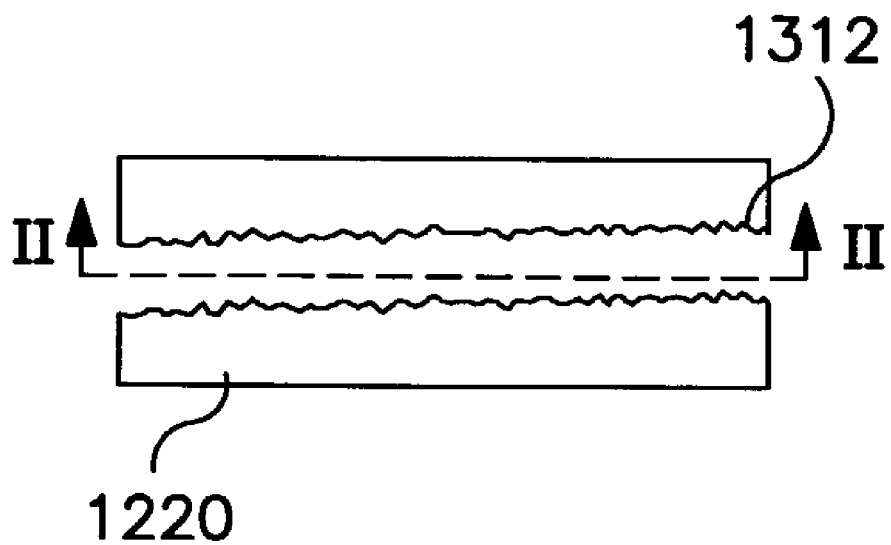
FIG. 3b is a top view of a cut work piece cut by a prior art hand held cutting method.

In contrast, the prior art grain pattern 1302 shown in FIG. 3*a* is perpendicular to the side 1220 because the cutting torch of the prior art directs gases perpendicular to the direction of cut. One of the main drawbacks in using the prior art cutting methods, especially when hand held, is that an uneven edge 1312 is formed as shown in FIG. 3*b*. Thus, the present invention provides for a much smoother edge. Additionally, a straighter edge may be formed using these devices than with either a hand held method or conventional machines. In yet another embodiment of the present invention, edge 1212 may be rounded 1120 as shown in FIG. 18, as opposed to the angular edge 1212 shown in FIG. 1.

It should be further understood by those of ordinary skill in the art that the foregoing presently preferred embodiments are exemplary only and that the attendant description thereof is likewise by way of words an example rather than words of limitation, and their use does not preclude inclusion of such modifications, variations and/or addition to the present invention as would be readily apparent to one of ordinary skill in the art, the scope of the present invention being set forth in the appended claims.

What is claimed is:

1. A piece of cut metal formed by a metal cutting apparatus, comprising:
   first and second surfaces, said first and second surfaces being disposed on opposite sides of said cut metal; and
   an edge connecting said first and second surfaces, wherein said edge has a grain pattern that is not perpendicular to said first and second surfaces of said cut metal.

2. The piece of cut metal according to claim 1, wherein said grain pattern of said edge is diagonal to at least one of said first and second surfaces of said cut metal.

3. The piece of cut metal according to claim 1, wherein said grain pattern of said edge is about parallel to at least one of said first and second surfaces of said cut metal.

4. The piece of cut metal according to claim 1, wherein said grain pattern of said edge has a diverging pattern.

* * * * *